United States Patent
Gotou

(10) Patent No.: US 6,449,707 B1
(45) Date of Patent: Sep. 10, 2002

(54) INFORMATION PROCESSING UNIT, INFORMATION PROCESSING STRUCTURE UNIT, INFORMATION PROCESSING STRUCTURE, MEMORY STRUCTURE UNIT AND SEMICONDUCTOR MEMORY DEVICE

(75) Inventor: Hiroshi Gotou, Tokyo (JP)

(73) Assignee: Fujitsu Limited, Kanagawa (JP)

( * ) Notice: Subject to any disclaimer, the term of this patent is extended or adjusted under 35 U.S.C. 154(b) by 0 days.

(21) Appl. No.: 09/068,327

(22) PCT Filed: Nov. 8, 1996

(86) PCT No.: PCT/JP96/03280

§ 371 (c)(1),
(2), (4) Date: Oct. 16, 1998

(87) PCT Pub. No.: WO97/17658

PCT Pub. Date: May 15, 1997

(30) Foreign Application Priority Data

Nov. 8, 1995 (JP) .............................................. 7-289776
Oct. 21, 1996 (JP) .............................................. 8-278089

(51) Int. Cl.$^7$ ............................ G06F 9/34; G06F 12/06; G06F 13/40; G06F 13/16; G06F 13/20

(52) U.S. Cl. ............................ 712/14; 712/13; 712/11; 710/65; 710/73; 710/74; 710/130; 710/52; 711/108; 711/143

(58) Field of Search ........................... 365/189, 230.03, 365/5.51, 201, 189.01, 230.01, 261, 219, 129.01, 88, 200, 189.5, 51; 326/83, 21, 88; 712/10, 36, 11, 14, 17, 13, 15, 16, 8; 711/108, 110, 107, 105, 109, 114, 142, 143, 173, 119, 129, 147, 145, 148, 146; 710/52, 61, 65, 73, 74, 12, 126, 129, 3, 7, 130; 345/468, 530

(56) References Cited

U.S. PATENT DOCUMENTS

| 4,591,981 | A |   | 5/1986  | Kassabov .................... 364/200 |
|-----------|---|---|---------|--------------------------------------|
| 4,742,474 | A |   | 5/1988  | Knierim ...................... 364/521 |
| 5,253,308 | A |   | 10/1993 | Johnson ........................ 382/49 |
| 5,293,341 | A | * | 3/1994  | Tsujimoto .................... 365/201 |
| 5,293,481 | A |   | 3/1994  | Mita et al. ................... 395/163 |
| 5,428,803 | A |   | 6/1995  | Chen et al. ................. 395/800 |
| 5,587,671 | A | * | 12/1996 | Zagar et al. ........... 365/189.05 |

FOREIGN PATENT DOCUMENTS

| EP | 0 325 504     | 1/1989 |
| EP | 0 325 504 A   | 7/1989 |
| EP | 0 570 950     | 5/1993 |
| EP | 0 610 513 A1  | 8/1994 |
| WO | WO 88 06322 A | 8/1988 |
| WO | WO94/01815    | 7/1993 |

OTHER PUBLICATIONS

Schmidt, et al. "Parallel–Computing Effizient Gemacht/ Datengesteuerter Arrayprozessor Für die Videosignalverarbeitung"Elektronik Jun. 8, 1990, vol. 12.

Alnuweiri et al. "An Efficient VLSI Architecture With Applications to Geometric Problems" Parallel Computing, vol. 12, No. 1, Oct. 1, 1989, pp. 71–93.

* cited by examiner

Primary Examiner—Daniel H. Pan
(74) Attorney, Agent, or Firm—Mark A. Haynes; Haynes Beffel & Wolfeld LLP

(57) ABSTRACT

A data processing unit comprises an input section 1 for inputting first data from the outside, an operation section 2 for operating the first data inputted therefrom, to generate second data, a memory section 3 for storing the second data, an output section 4 for outputting the second data stored in the memory section to the outside, and a control section 5 for controlling the memory section to enable storing and outputting of the second data.

50 Claims, 20 Drawing Sheets

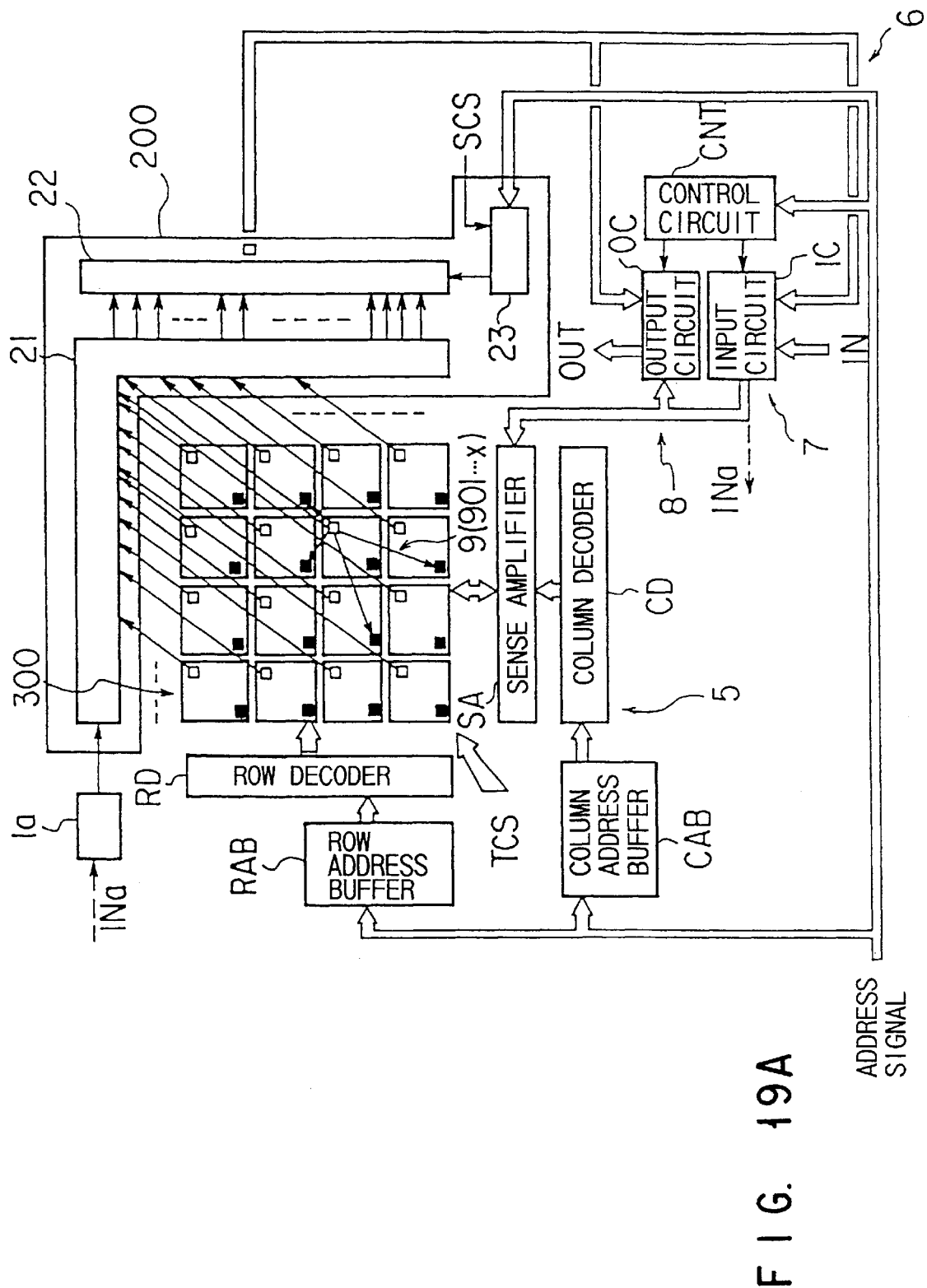
F I G. 19A

INFORMATION PROCESSING UNIT, INFORMATION PROCESSING STRUCTURE UNIT, INFORMATION PROCESSING STRUCTURE, MEMORY STRUCTURE UNIT AND SEMICONDUCTOR MEMORY DEVICE

TECHNICAL FIELD

The present invention relates to the basic structure and the entire structure of a data processing apparatus including a semiconductor memory device, and specifically, to a data processing structure which internally operates and stores data in itself, a data processing structure unit consisting of a plurality of data processing units which transfer data to make interaction with each other, and a data processing structure represented by a semiconductor memory device consisting of the data processing unit or data processing structure unit.

BACKGROUND ART

Recently, data processing apparatuses represented by image data processing, data memory or the like have been developed and available as products. For example, semiconductor memory devices such as a dynamic random access memory (DRAM), a static random access memory (SDRAM), and the like have already been subjected to mass-production and used so as to comply with various specifications. In these data processing apparatuses, it is a basic principle that data to be read out ,is perfectly the same as data to be written, and there originally is a lack of an idea of making any operation processing on data to be written.

In this respect, a proposal has been made as to a concept for modifying a kind of dispersed data processing system into a device, i.e., cells utilizing a quantum phenomenon are realized and disposed as operation factors in a matrix-like array and the cells are caused to make close interactions between each other in accordance with rules set in compliance with purposes (Amamiya Yoshihito and Akazawa Masamichi, "How a quantum phenomenon should be combined with data processing to prepare a LSI with a quantum effect device", Applied Physics, Vol. 64, No. 8, pages 765 to 768). In a device realized by the concept, for example, when four adjacent cells are "1" where a center cell surrounded by eight cells is "1", the center cell is next changed to "0" in a step. When two adjacent cells are "1", the state of "1" is maintained. Where the center cell is "0", the center cell is not changed to "1" even when two adjacent cells are "2". Thus, it is said that a change of the state of the center cell and further a change of data in a device can be realized.

However, in the prior art example described above, only an extremely conceptual instruction can be found with respect to realization of a device of a dispersed data processing system. Therefore, in consideration of a specific device, there is a problem as to what will be the form at the level of a device.

The present invention has been made to a situation as described above and has an object of providing a technique of realizing a kind of dispersed data processing system at the level of device, e.g., a special data processing unit or memory structure unit which realizes the technique, a data processing structure unit constructed by providing a plurality of said data processing units, the data processing unit, or a data processing structure comprising the data processing structure unit and a semiconductor memory device comprising the memory structure unit.

DISCLOSURE OF INVENTION

A data processing unit according to the present invention basically comprises: input for inputting first data from outside; an operation circuit for operating the first data to generate second data; memory for storing the second data; output for outputting the second data stored in the memory to the outside; and a controller for controlling the memory to enable storing and outputting of the second data.

The data processing unit may comprise a data reproduction circuit for reproducing the second data outputted. Further, the data processing unit may comprise a write circuit which is for inputting third data from the outside and writes the third data as the second data into the memory, and a read circuit for reading data stored in the memory. The operation circuit of the data processing unit may be a logic circuit among a group of logic circuits consisting of an identity logic circuit, an inversion logic circuit, an exclusive OR circuit, an exclusive AND circuit, an OR circuit, and an AND circuit, and may comprise at least two logic circuits among a group of logic circuits consisting of an identity logic circuit, an inversion logic circuit, an exclusive OR circuit, an exclusive AND circuit, an OR circuit, and an AND circuit, and a selector for selecting one output from outputs of the at least two logic circuits.

A first data processing structure unit according to the present invention is a dimer-like structure unit consisting of two data processing units each described above, in which the output of one data processing unit is electrically connected with the input of the other data processing unit. Further it is preferred that the two data processing units are arranged adjacent to each other.

A second data processing structure unit according to the present invention is a dimer-like structure unit consisting of first, second, and third data processing units as described above, in which the output of the first data processing unit is electrically connected with the input of the second data processing unit, and the output of the second data processing unit is electrically connected with the input of the third data processing unit. In this trimer-like data processing structure unit, it is preferred that the first and second data processing units, as well as the second and third data processing units, are arranged adjacent to each other.

A first data processing structure according to the present invention is a structure comprising a plurality of data processing units as described above, in which the first data of each data processing unit is one or two or more data items, and all or a part thereof is the second data outputted from the output of other one or two or more data processing units. The first data processing structure preferably comprises connection circuits for electrically connecting the input of each of the data processing units with the output of a data processing unit other than the data processing units itself.

A second data processing structure according to the present invention comprises two dimer-like data processing structure units each described above, and connection circuits for electrically connecting a first or second data processing unit of one of the data processing structure units with a first or second data processing unit in the other data processing structure unit.

A third data processing structure according to the present invention comprises two trimer-like data processing structure units each described above, and connection circuits for electrically connecting a first, second, or third data processing unit of one of the data processing structure units with a first, second, or third data processing unit in the other data processing structure unit.

In the second and third data processing structures constructed by a polymer-like data processing structure unit including the dimer-like and trimer-like units, it is preferred that two data processing structure units are arranged adjacent to each other, like an array. Where these data processing structures comprise a plurality of bit lines and a plurality of word lines crossing the bit lines, it is preferred that the data processing units in the data processing structure unit are provided at a cross-position between the bit lines and the word lines.

A fourth data processing structure according to the present invention comprises a plurality of data processing units, and each of the data processing units comprises: an operation circuit for operating on first data inputted from other one or two or more data processing units, by one of a group of logic operations consisting of identity, inversion, exclusive OR, OR, and AND, to generate second data; memory for storing the second data; output for outputting the second data stored in the memory to one or two or more other data processing units than each of the data processing units itself; and a controller for controlling the memory to enable storing and outputting of the second data.

A fifth data processing structure according to the present invention comprises a plurality of data processing units, and each of the data processing units includes: an operation circuit for operating on first data inputted from one or two or more other data processing units than the data processing unit itself, by at least two of a group of logic operations consisting of identity, inversion, exclusive OR, OR, and AND, and for selecting one of operation results thereof, as second data; memory for storing the second data; output for outputting the second data stored in the memory to one or two or more other data processing units than the data processing unit itself; and a controller for controlling the memory to enable storing and outputting of the second data.

The fourth and fifth data processing structures may further comprise a reproduction circuit for reproducing second data in the memory, a write circuit for inputting third data from the outside of the data processing unit and for writing the third data as second data, or a read circuit for reading data stored in the memory.

In a sixth data processing structure according to the present invention, a first region occupied by a data processing unit comprising a write circuit for inputting third data from the outside and for writing the third data as second data into memory, and a read circuit for reading data stored in the memory, and a second region occupied by a data processing unit which does not comprise such write and read circuits are image-assigned (images are allocated to that region), and connection circuits for electrically connecting output and input of one or two or more data processing units in the first and second regions with each other is comprised.

A first semiconductor memory device according to the present invention consists of a plurality of bit lines, a plurality of word lines, and first and second memory structure units provided at a cross-position between the bit lines and the word lines, wherein each of the first and second memory structure units comprises input for inputting first data from outside, an operation circuit for operating on the first data inputted from the input to generate second data, memory for storing the second data, output for outputting the second data stored in the memory to the outside, a controller for controlling the memory to enable storing and outputting of the second data, a switch circuit by which connection and disconnection between the memory and a bit line are controlled by a word line, and a connection circuit for electrically connecting the input of the first memory structure unit and the output of the second memory structure unit with each other.

A second semiconductor memory device according to the present invention consists of a plurality of bit lines, a plurality of word lines, and first, second, and third memory structure units provided at a cross-position between the bit lines and the word lines, wherein each of the first, second, and third memory structure units comprises input for inputting first data from outside, an operation circuit for operating the first data inputted from the input to generate second data, memory for storing the second data, output for outputting the second data stored in the memory to the outside, a controller for controlling the memory to enable storing and outputting of the second data, a switch circuit by which connection and disconnection between the memory and a bit line are controlled by a word line, and a connection circuit for electrically connecting the input of the first memory structure unit and the output of the second memory structure unit with each other, as well as the input of the second memory structure unit and the output of the third memory structure unit with each other. In this case, it is preferred that the first and second memory structure units as well as the second and third memory structure units are adjacent to each other.

A third semiconductor memory device according to the present invention consists of a plurality of bit lines, a plurality of word lines, and a plurality of memory structure units provided at a cross-position between the bit lines and the word lines, wherein each of the memory structure units comprises a plurality of input terminals for inputting a plurality of first data items from outside, a plurality of operation circuits for operating on the plurality of first data items inputted from the plurality of input terminals to generate second data, memory for storing the second data, an output terminal for outputting the second data stored in the memory to the outside, a controller for controlling the memory to enable storing and outputting of the second data, a switch circuit by which connection and disconnection between the memory and a bit line are controlled by a word line, and a connection circuit for electrically connecting the plurality of input terminals of each of the memory structure units itself with the output terminals of the plurality of memory structure units adjacent to each of the memory structure units itself such that the input terminals of each of the memory structure units correspond to the output terminals of the plurality of memory structure units adjacent to each of the memory structure units itself.

Note that the operation circuit in the memory structure unit of the first to third semiconductor memory devices may be a logic operation circuit for operating on the first data by one of a group of logic operations consisting of identity, inversion, exclusive OR, OR, and AND, to generate the second data, or may comprise a logic operation circuit for operating the first data by at least two of a group of logic operations consisting of identity, inversion, exclusive OR, OR, and AND, and a selector for selecting one of operation results from the logic operation circuit, as the second data.

According to the present invention, a data processing unit itself, represented by a memory structure unit or a memory cell, is capable of autonomously operating on data from the outside, updating and storing a result thereof, and outputting it to the outside (hereinafter, this kind of function of data processing in the data processing unit will be called an "autonomous data processing function"). Therefore, it is possible to realize a unit which interacts with the outside, and as a result, it is possible to realize dispersed data processing in the relationship between the outside and the data processing unit. The "outside" used herein means an environment other than the data processing unit. Therefore, the "outside" naturally includes all of another data processing unit, a data processing section (including a clock circuit) other than the data processing unit itself, incorporated in a data processing structure such as a semiconductor memory device including the data processing unit itself, or the outside of the data processing structure, and the like. However, it should be noted that an identity logic operation as a kind of operation process is included in case where data outputted to the outside from the data processing unit itself through an output is taken in as data from the "outside" and subjected again to the autonomous data processing in the processing unit itself.

Although the data processing unit can be arranged so as to perform only the autonomous data processing function as described above, the data processing unit can be arranged so as to perform a basic data storing function which enables writing/reading of data by address-designation, like in case of a memory cell in a known semiconductor memory device (hereinafter, this kind of function is called a "basic data processing function").

Further, the controller which controls the memory to enable storing and outputting of data is preferably a means for supplying a control command to the memory from the outside, in consideration of a physical request for downsizing the area of the data processing unit. In this case, the "outside" may be an internal section of a data processing structure including the data processing unit itself or an external section thereof. In addition, an embodiment of the controller may be a control circuit which is incorporated separately in a data processing structure including the data processing unit itself and which is controlled by a signal from the outside of the data processing structure and supplies a control command to the memory.

In addition, according to the present invention, it is possible to realize a dimer like data processing structure unit consisting of two processing units which interact with each other and a trimer-like data processing structure unit consisting of three processing units which interact with each other. However, it is naturally possible to constitute a tetramer-like or higher data processing structure unit by arbitrarily combining a single processing unit and dimer-like and trimer-like data processing units with each other. A polymer-like data processing structure unit can be realized by electrically connecting a plurality of data processing units. In this kind of data processing structure unit, one data processing unit may simply perform only an autonomous data processing function, while another processing unit may perform a basic data processing function or both of the basic data processing function and the autonomous data processing function. Or, all the processing units may perform two of the data processing functions.

In the present application, "operation" in a data processing unit can be replaced with "processing", and is rather a wider concept than processing, in the point of including, needless to say, basic logic operations represented by inversion, exclusive OR, OR, and AND, and an identity logic operation. The identity logic operation circuitoperation processing which outputs inputted data substantially or finally unchanged. Therefore, simple transfer of data is included in the identity logic operation. The identity operation is useful when data stored in a memory and outputted to the outside is reproduced later. In addition, for example, a case where the frequency of a reference clock supplied from the outside or a clock circuit in a data processing structure is changed or delayed by another clock circuit included in the data processing unit is equivalent to performance of a kind of "processing" on an input signal on the time axis, and therefore, this kind of frequency-dividing processing is included in the concept of "operation".

The selector for selecting an appropriate one of the plurality of logic operations described above may be a circuit which performs the selection by a selection command supplied from the outside, in consideration of the physical request for downsizing of the area of the data processing unit, like the controller described above. In this case, the "outside" may be an internal section or an external section of the data processing structure including the processing unit, like in the case of the controller described above. In addition, an embodiment of the selector may be a selection circuit incorporated in the data processing structure, which is controlled by a signal supplied from the outside of the data processing structure including the data processing unit and supplies a selection command to a selection gate.

Electric connection between a data processing unit and the outside can be realized by a connection between the input of the data processing unit and the outside. Electric connection between processing units in a polymer-like data processing structure unit can be realized by a connection between the input of one processing unit and the output of another processing unit or the output of the one processing unit itself. Further, in consideration of the physical request for the connection, the request for downsizing of the data processing structure, the request from operation speeds, and other requests from design matters, it is preferred that a polymer-like data processing structure unit between adjacent data processing units, and desirably, between data processing units arranged closest to each other.

In addition, from the idea of "polymer" in data processing, it is possible to realize higher dispersed data processing. For example, when a logic operation too complicated for an operation in one single data processing unit is desired, a plurality of element operations required for the logic operation are assigned to two or more data processing units constituting a polymer-like data processing structure unit, and the logic operation can be performed by the entire polymer. Thus, it is possible to greatly enhance the flexibility and degree of freedom of design of dispersed data processing by the new idea according to the present invention.

In addition, in the case where a part of a polymer-like data processing unit does not comprise a write/read circuit but performs only an autonomous data processing function and the rest of the data processing unit performs both an autonomous data processing function and a basic data processing function, regions may be image-fixed respectively for the functions. Therefore, design can be performed for every region in a first stage of circuit design, and electric connection between regions can be designed in a subsequent second stage, so that the flexibility and degree of freedom of design of dispersed data processing can be greatly enhanced.

In addition, it is needless to say that the present invention does not exclude a case where the data processing units and the like are formed by quantum elements but can be practiced with equal functions and advantages in case where the units and the like are formed by quantum elements.

In the present invention, an embodiment which is not more commercial is not excluded. However, a more actual embodiment according to the present invention is, for example, a case where an array of memory cells is constructed by providing data processing units at cross-positions between a plurality of bit lines and a plurality of word lines. In this memory cell array, each memory cell performs a basic data processing function, i.e., each memory cell can perform writing or storing and reading or outputting of data by designation of an address through a bit line and a word line, and can also perform an autonomous data processing function as a feature of the present invention. That is, it is possible to exchange memory data between each memory cell and another memory cell, to perform operation processing on received data, and to store again an operation result thereof in place of data stored originally or store again the data stored originally itself, so that the operation result can be outputted when the memory cell is designated later.

In a two-dimensional memory cell array in which a bit line and a word line cross each other, there are normally two to four memory cells arranged closest to a particular memory cell, and there are normally eight or more memory cells adjacent to the particular memory cell. In a memory cell array in which memory cells are arranged three-dimensionally, it is apparent that the number of memory cells closest or adjacent to a particular memory cell is more than that in a case of a normal two-dimensional arrangement. As an actual problem, the difference between the "closest" and "adjacent" will be determined individually in accordance with specific arrangements of a plurality of memory cells in a specific memory cell array. The data processing unit, data processing structure unit, and data processing structure according to the present is invention can respectively be considered as a memory cell, memory cell array, and memory device, although they are not limited thereto. Likewise, the concept of the "closest" and the "adjacent" and the difference therebetween can be considered with reference to the case of the memory cell, memory cell array, and memory device.

In case where a data processing structure represented by a semiconductor memory device comprising the memory cell array includes a plurality of data processing structure units, these data processing structure units can be electrically connected with each other so that data can be transferred therebetween. The connection between the data processing structure units is provided for the same object as that of the connection between processing units in a polymer-like data processing structure unit. That is, for example, in case where the load of operation processing is too large for one single data processing structure unit, the processing elements constituting the operation processing are assigned to the plurality of data processing structure units and to one or two or more data processing units constituting each of the plurality of structure units, and the aimed operation processing can be performed by the entire polymer. Therefore, as this example means, the idea of connection between structure units enables enhancement of the flexibility and degree of freedom of design of a dispersed data processing. Note that it is also preferred to make electric connection between data processing structure units arranged adjacent to each other or desirably arranged closed to each other in consideration of the physical request for connection, the request for downsizing of the data processing structure, the request from operation processing, and other requests from design matters.

BRIEF DESCRIPTION OF DRAWINGS

FIGS. 19A, 19B, 19C, and 19D are block diagrams and partial explanation views showing a basic structure constructed by four or more data processing units, as a tenth embodiment according to the present invention.

BEST MODE OF CARRYING OUT THE INVENTION

Figure 1:
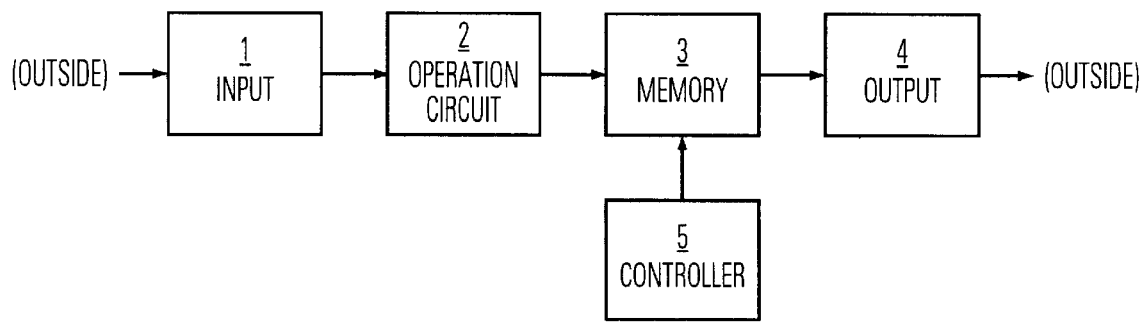
FIG. 1 is a block diagram showing a basic structure of a single data processing unit having an autonomous data processing function as a first embodiment according to the present invention.

In the following, with reference to the figures, preferred embodiments according to the present invention will be explained. In the following plurality of figures, common or similar elements will be denoted by common reference numerals except for a case where a distinction is particularly made.

[First Embodiment]

FIG. 1 is a block diagram showing a first embodiment, i.e., a basic structure of a single data processing unit having an autonomous data processing function. As shown in this figure, one single data processing unit vehas necessary components of an input 1, an operation circuit 2, a memory 3, an output 4, and a controller 5, and is distinguished from the outside. Data supplied from the outside is inputted into the input 1. The data outputted from the input 1 is supplied as first data to the operation circuit 2. The operation circuit 2 subjects the supplied first data to an operation and generates second data. The second data is supplied from the operation circuit 2 to the memory 3 and is stored in the memory 3. The second data stored in the memory 3 is supplied to the output 4 and is further supplied to the external device. The controller 5 controls the memory 3 to enable storing and outputting of the second data in the memory 3. Although it suffices that the input 1 consists of an input terminal or a group of input terminals, the input 1 may comprise a decoder for encoding data to be inputted for subsequent data processing. In preferred embodiments, the operation circuit 2 comprises a circuit or a group of circuits for performing a basic logical operation represented by identification, inversion, exclusive OR, logical OR, and AND, or a circuit or a group of circuits for the other data processing. The memory 3 is a dynamic or static data storage unit. A basic structure including a data storage capacitor and a switch element connected thereto is sufficient for the dynamic data storage unit, as represented by a DRAM (Dynamic Random Access Memory) cell. The static data storage unit is a temporary memory represented by a SRAM (Static Random Access Memory) cell or a latch circuit. The output 4 consists of an output terminal or a group of output terminals. Note that the controller 5 contains a refresh circuit not shown, in the case where the memory 3 is a dynamic data storage unit. Although a circuit having a known structure in a DRAM is sufficient as the refresh circuit, it is rare that every data processing unit has one refresh circuit since it conflicts a request for down-sizing of a device. It is preferred that one refresh circuit is provided for a plurality of data processing units.

[Second Embodiment]

Figure 2:
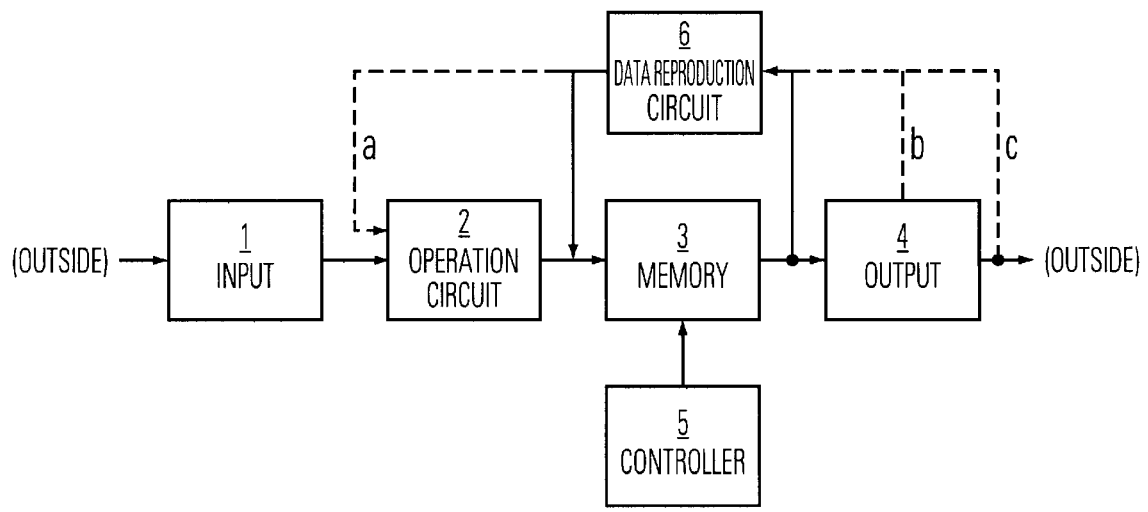
FIG. 2 is a block diagram showing another basic structure of a single data processing unit having an autonomous data processing function as a second embodiment according to the present invention.

FIG. 2 relates to a second embodiment according to the present invention and is a block diagram showing another basic structure of a single data processing unit having an autonomous data processing function. The second embodiment has a structure in which the first embodiment is added with a data reproduction circuit 6. The data reproduction circuit 6 has a function of feeding back an output from the memory 3 as an input to the memory. However, the output from the memory 3 may be fed back as an input to the operation circuit 2, and an identification operation may be performed in the operation circuit. The result therefrom may be inputted to the memory 3 (indicated by an arrow a"a" of a broken line in FIG. 2). In addition, the input to the data reproduction circuit needs not be an output from the memory 3 as described above, but may be a direct output (indicated by a broken line b"b" in the same figure) from the output 4 and may be an output branched from a terminal by which the output provides an output to the outside (indicated by a broken line "c" in the same figure).

The data reproduction circuit 6 has a function of again storingagain data equivalent or equal to second data into the memory after the memory 3 outputs the second data to the outside. As a result of this, the memory 3 is not limited to a latch function of simply storing temporarily second data but has a memory function of storing second data for a long time period. Where this memory function is emphasized, it may be appropriate that the data processing unit according to the present invention is called a memory structure unit.

[Third Embodiment]

Figure 3:
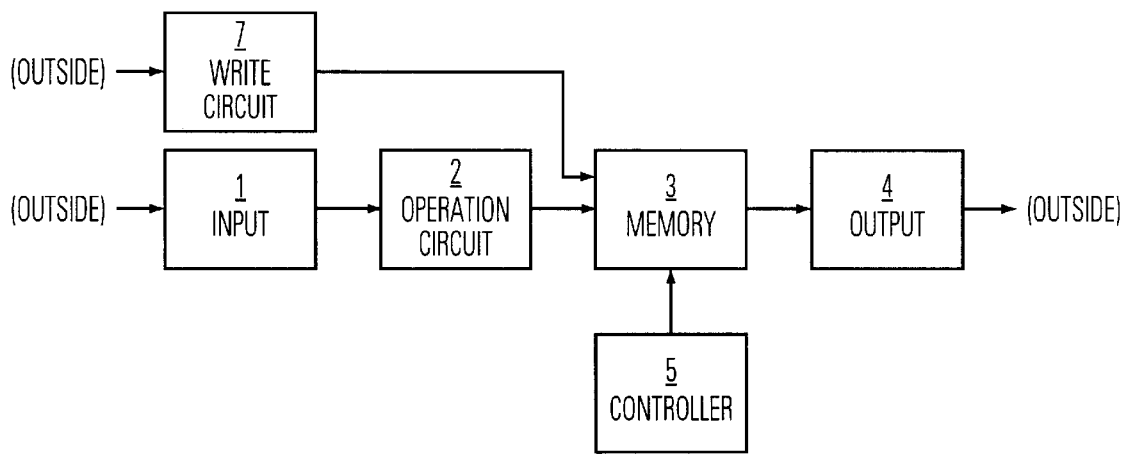
FIG. 3 is a block diagram showing another basic structure of a single data processing unit having an autonomous data processing function as a third embodiment according to the present invention.

FIG. 3 relates to a third embodiment according to the present invention and is a block diagram showing a structure which including a write circuit 7 for writing data from the outside into the memory 3. Where the memory 3 is a memory cell and data is written into the memory cell through a bit line, the bit line and a circuit for driving the bit line is a write circuit which can be understood most easily. In this case, a structure for designating an address of the memory cell (e.g., a word line or a circuit for driving the word line) is contained in the controller 5.

[Fourth Embodiment]

Figure 4:
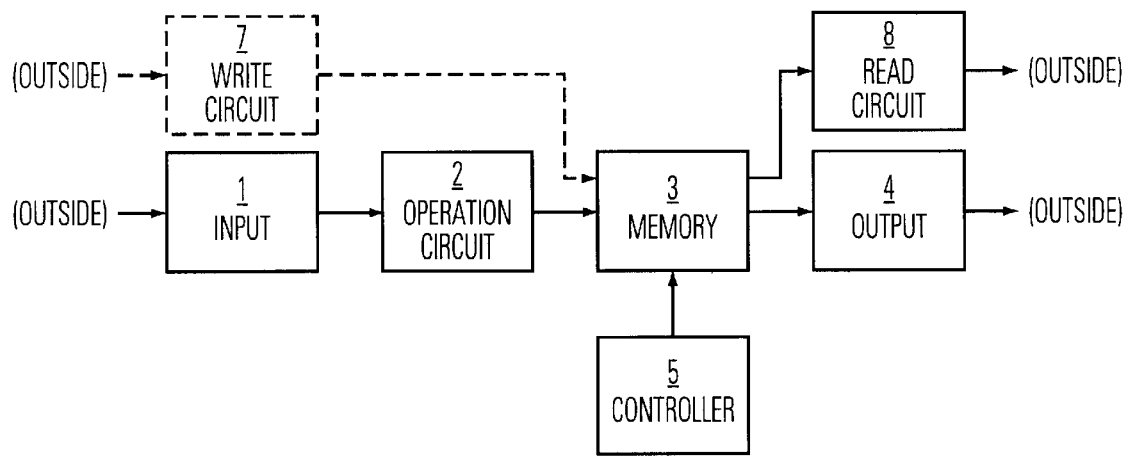
FIG. 4 is a block diagram showing another basic structure of a single data processing unit having an autonomous data processing function as a fourth embodiment according to the present invention.

FIG. 4 relates to a fourth embodiment according to the present invention and is a block diagram of a structure in which the first embodiment is further added with a read circuit 8 for reading second data stored in the memory 8 to the outside. Where the memory 3 is a memory cell and data is read out into the memory cell through a bit line, the bit line and a circuit for driving the bit line is a read circuit which can be understood most easily. In this case, a structure for designating an address of the memory cell (e.g., a word line or a circuit for driving the word line) is contained in the controller.

Note that it is normal to comprise the write circuit 7 indicated in the third embodiment together with the read circuit 8, as indicated by a broken line in FIG. 4, where the memory cell provided at a cross point of the bit line and the word line is the memory 3.

[Fifth Embodiment]

Figure 5:
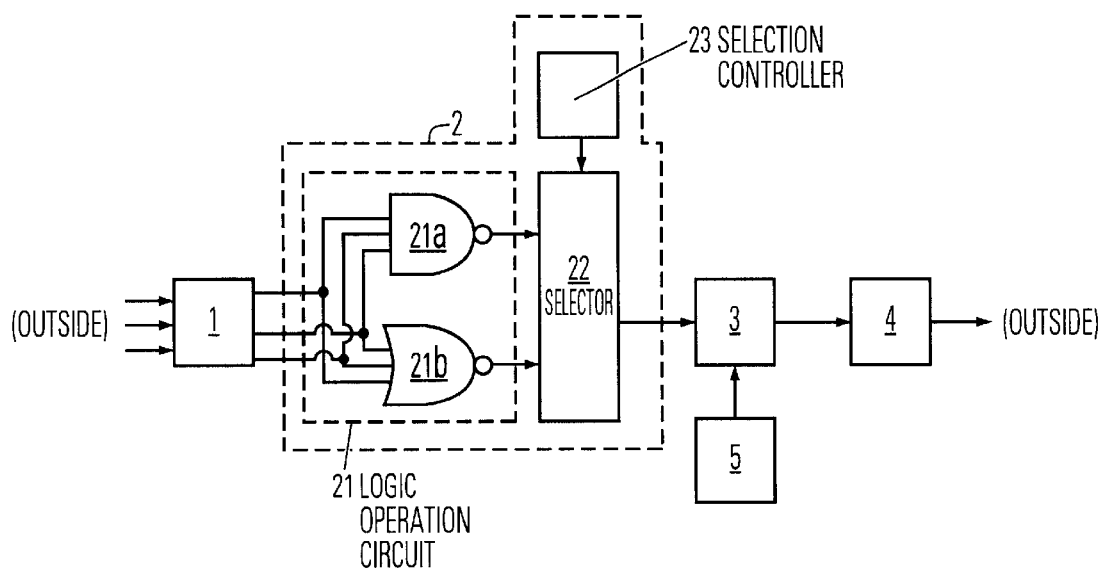
FIG. 5 is a block diagram showing a basic structure of a data processing unit having an autonomous data processing function as a fifth embodiment corresponding to a modification of the first embodiment.

FIG. 5 relates to a fifth embodiment according to the present invention and is a block diagram of a data processing unit having an autonomous data processing function equivalent to a modification of the first embodiment. In the figure, a plurality of first data items are inputted to the operation circuit 2 through the input 1. In this embodiment, the operation circuit 2 comprises a logical operation circuit 21 which is inputted with first data and logically operates the first data to output an operation result of 1 or 2 or more, and a selector 22 which selects an output of the logical operation circuit. Operation of the selector 22 is controlled by a selection controller 23. The logical operation circuit 21 has a structure in which a NAND gate 21a and a NOR gate 21b are arranged in parallel such that the gates 21a and 21b respectively and independently output logical operation results. However, the logical gates are not limited to NAND and NOR gates, but may be of AND, OR, exclusive OR, exclusive AND, or inversion or may be of an identification logic which directly maintains first data unchanged. Although depending on the request for downsizing of the circuit, a combination of these logical gates may be the logic operation circuit 21a.

Further, the simplest structure of the selector 22 is obtained by pass transistors each of which has a gate electrode connected to the selection controller 23 that opens/closes a gate in accordance with a control signal from the selection controller, and has other two electrodes connected to an output end of the logical operation circuit 21a and an input end of the memory 3. The pass transistors correspond in number to the logic gates. The selector 22 may be a multiplexer subjected to timing control by the selection controller. In any form of selection structure, the selector 22 selects is only one from one or two or more outputs of the logic gates and outputs the selected one to the memory 3. The selection controller 23 controls operation of the selector 22 through a control line not shown from a circuit separately provided in a device including the data processing unit according to the embodiment 5 or a circuit provided in the outside. Note that the operation of the selector 23 and the operation of the memory 3 are synchronized, so that the controller 5 and the selection controller 23 are driven in a synchronization.

Another structure of the selector 22 is a programmable logic array circuit. The programmable logic circuit selectively outputs a necessary operation result from a plurality of inputted operation results, based on a pre-programmed logic. In this case, a circuit which generates a program signal for pre-programming the programmable logic circuit corresponds to the selection controller 23.

[Sixth Embodiment]

Figure 6:
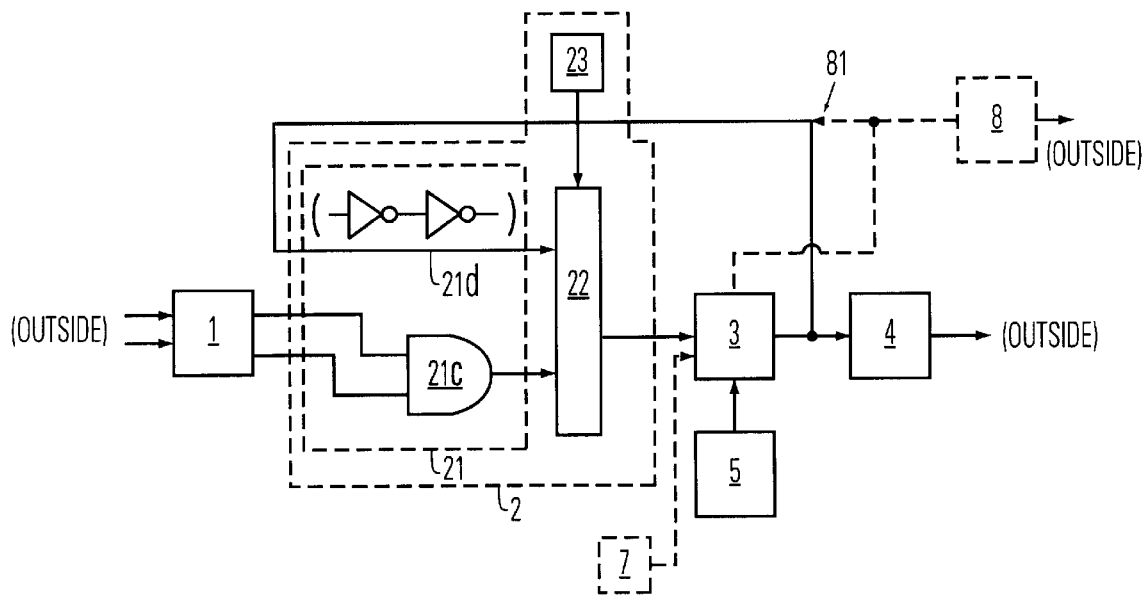
FIG. 6 is a block diagram showing a basic design of a data processing unit having an autonomous data processing function as a sixth embodiment, equivalent to a modification of the second or fifth embodiment.

FIG. 6 relates to a sixth embodiment according to the present invention and is a block diagram of a basic concept of a data processing unit having an autonomous data function equivalent to a modification of the second or fifth embodiment. In this figure, a plurality of first data items are inputted to the operation circuit 2 through the input from the outside. The operation circuit 2 is inputted with the output of the memory 3, like a feedback. The plurality of first data items are inputted to the AND logic gate 21c in the logic operation circuit 21, and the logical operation results are outputted to the selector 22. A feedback-like input from the memory 3 is outputted to the selector 22 directly or through two inversion logic gates connected in series. The selector 22 controlled by the selection controller 23 alternatively outputs inputted data as second data to the memory 3. The logic gate which processes the first data items needs not be limited to one AND logic gate like this embodiment, but a plurality of gates and/or different kinds of gates may be used as far as logical operation results are outputted to the selector 22.

According to the sixth embodiment, by the selection controller 23 and the controller 5, first data from the outside is logically operated to select a desired result, and this is stored as second data into the memory 3 and can be outputted to the outside from the memory. Further, the data can be outputted and fed back through the operation circuit 2 and stored again in the memory 3. Note that second data needs not be stored through the operation circuit 2, but may be directly written into the memory 3 by the write circuit 7 indicated by a broken line in FIG. 6. In addition, the output of second data to the outside needs not be through the output 4, but may be carried out by the read circuit 8 indicated by a broken line in the figure. In the case where second data is outputted to the outside by the read circuit, storing of the data again into the memory 3 for the second data may be carried out through a branch line 81 of a signal line between the read circuit 8 and the memory 3.

[Seventh Embodiment]

Figure 7:
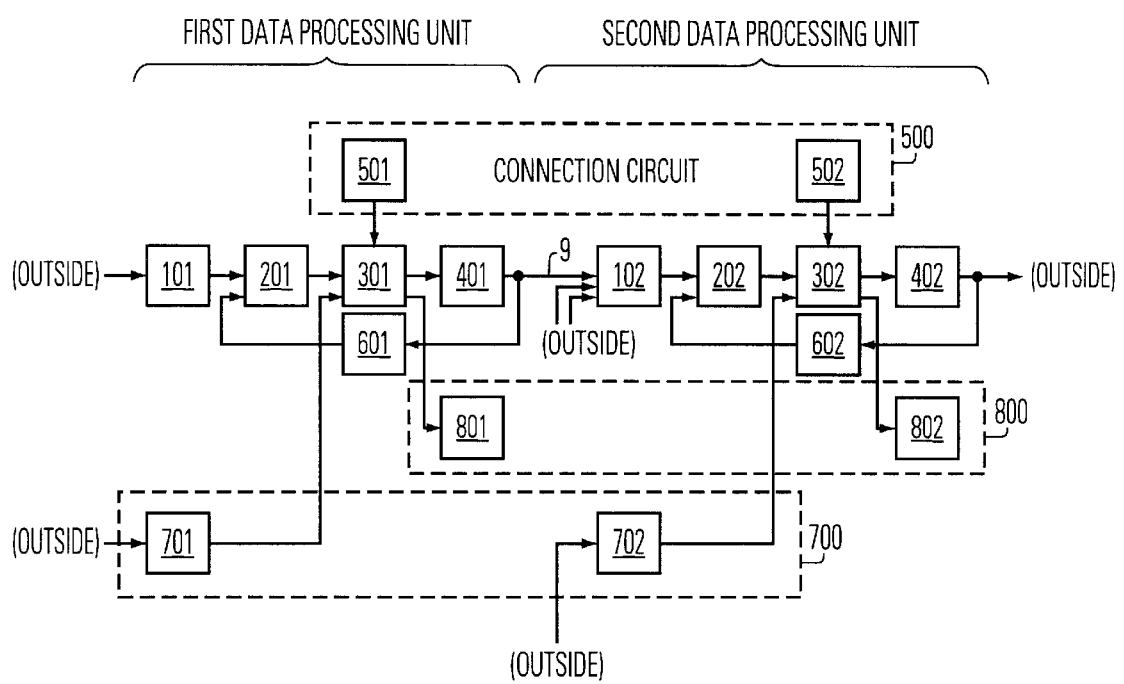
FIG. 7 is a block diagram showing a basic structure of a dimer-like data processing structure unit as a seventh embodiment according to the present invention.

FIG. 7 relates to a seventh embodiment according to the present invention and is a block diagram showing a basic structure of a dimer-like data processing structure unit constructed by serially connecting first and data processing units (or memory structure units where the memory function is considered more important) each having an autonomous data processing function.

Although both of the first and second data processing units are data processing units according to the first embodiment, these units may be any of data processing units according to the second to sixth embodiments. In this figure, input 101 and 102 are for inputting first data from the outside, performing a predetermined operation on the inputted first data to generate second data, and outputting the second data. In addition, the operation circuit may contain, for example, a logical operation circuit, a selector, and a selection controller like the fifth embodiment described above, although not shown in the figures. Memory elements 301 and 302 store the outputted second data, and outputs 401 and 402 output the second data stored in the memory elements 301 and 302 to the outside. Controllers 501 and 502 control operation of storing and outputting of the second data of the memory elements 301 and 302, respectively. Data reproduction circuits 601 and 602 reproduce or store again the second data outputted from the memory elements 301 and 302 into the memory. Write circuits 701 and 702 are for inputting third data from the outside and ewriting the data into the memory elements 301 and 302 of the first and second data processing units, respectively. The memory elements store and output the third data as second data. Read circuits 801 and 802 are structures which are provided separately from the outputs 401 and 402 and read the second data stored in the memory elements 301 and 302, respectively. An output 401 of the first data processing unit is electrically connected to one of inputs 102 of the second data processing unit. A connector 9 which realizes this connection is normally a wire made of a conductive material such as a metal layer or a polysilicon layer rendered highly conductive by implantation of impurities, in a semiconductor device.

The input 102 of the second data processing unit receives an input of first data from the outside other than an output of the first data processing unit. In this kind of dimer-like data processing structure unit, operations of the first and second data processing units are synchronized with each other. From this meaning, it ismore preferable and practical that the controllers 501 and 502 are dealt with as one controller 500. Where the data processing structure units are arranged like an array, an address of a particular data processing unit is specified and writing and reading of data are carried out, as for the write circuits 701 and 702 and the read circuits 801 and 802. Therefore, it ismore preferable that each of these means is dealt with as one writing circuit 700 or a reading circuit 800.

According to the dimer-like data processing structure units, one operation process is divided for two operation circuits, and the one operation process can be performed as a whole. Therefore, the area of one of the data processing units is not excessively large in comparison with the other data processing unit, and a well-balanced structure is obtained. Therefore, the structure unit is preferable for design of a data processor constructed by an array arrangement of a plurality of data processing units. In addition, since two data processing units can be dealt with as one, the entire design of the data processor can be facilitated.

Figure 21:
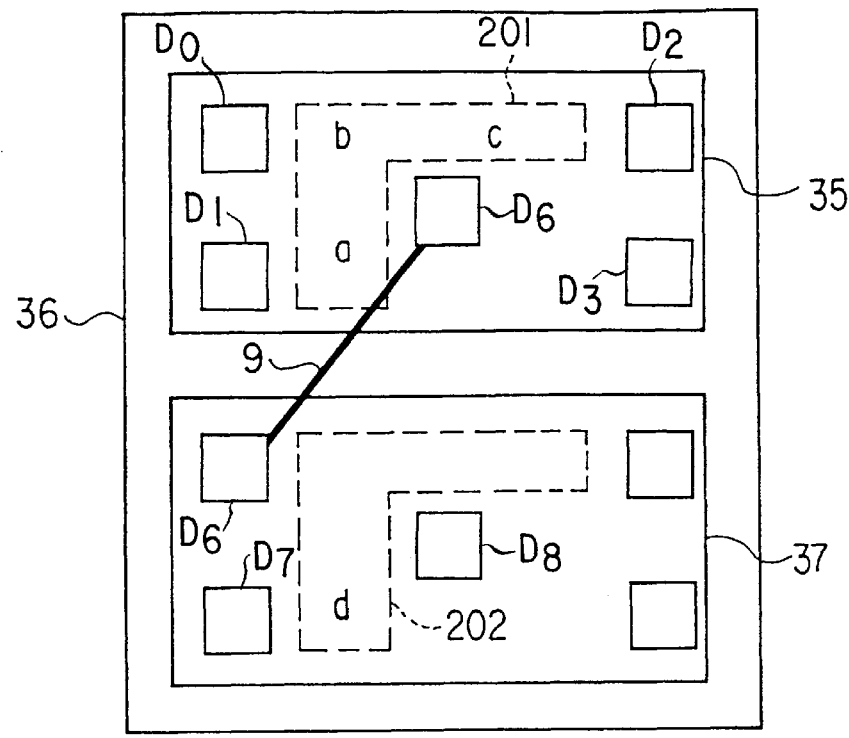
FIG. 21 is a block diagram showing an example in which a parity setting circuit is incorporated in a dimer-like data processing unit according to the present invention.

FIG. 21 shows a specific example in view of an operation function of this kind of dimer-like data processing structure unit. That is, in the specific example shown in FIG. 21, a parity setting circuit can be formed by using a plurality of exclusive OR circuits a, b, c, and d for operation functions 201 and 202 of the dimer-like data processing unit 36 according to the present invention.

Figure 23:
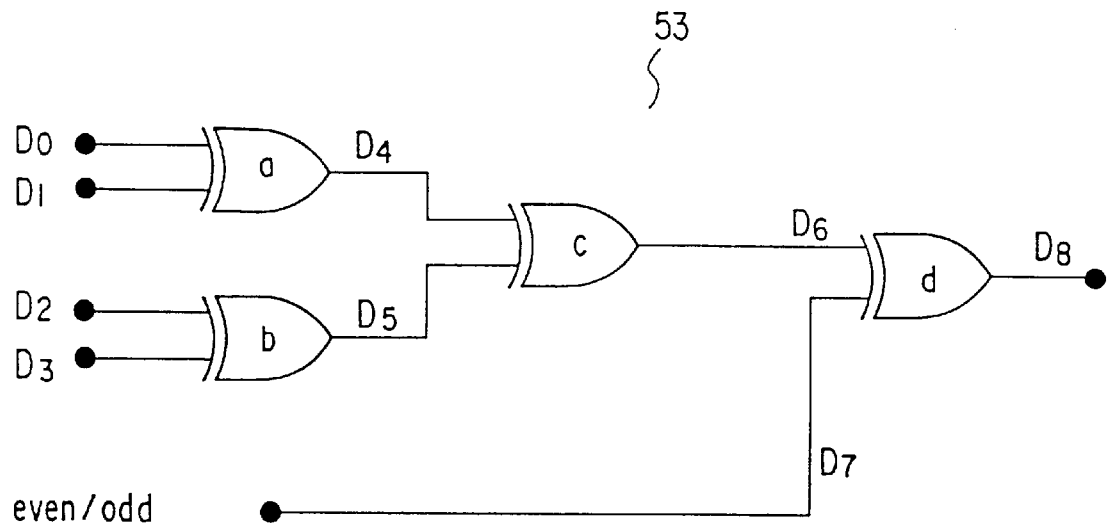
FIG. 23 is a circuit diagram showing an example of a parity setting circuit.

This logic circuit is divided into two regions indicated by broken lines in the figure, and the two regions are distributed for operation circuits 201 and 202 as two data processing units constituting a dimer-like data processing structure unit. Connections required between the two regions are obtained by a connection line 9. The dimer-like data processing structure unit completed in this manner and shown in FIG. 21 is equivalent to a logic circuit 53 shown in FIG. 23 with respect to the contents of operations actually performed. That is, signals D0 to D8 in the respective circuits operationally correspond to each other.

In the operation of the parity circuit, an output Q is H when a data input is of an odd-numbered parity, where an even-numbered/odd-numbered input is L. Inversely, the output is H is when the data input is an even number where the even-numbered/odd-numbered input is H.

Figure 22:
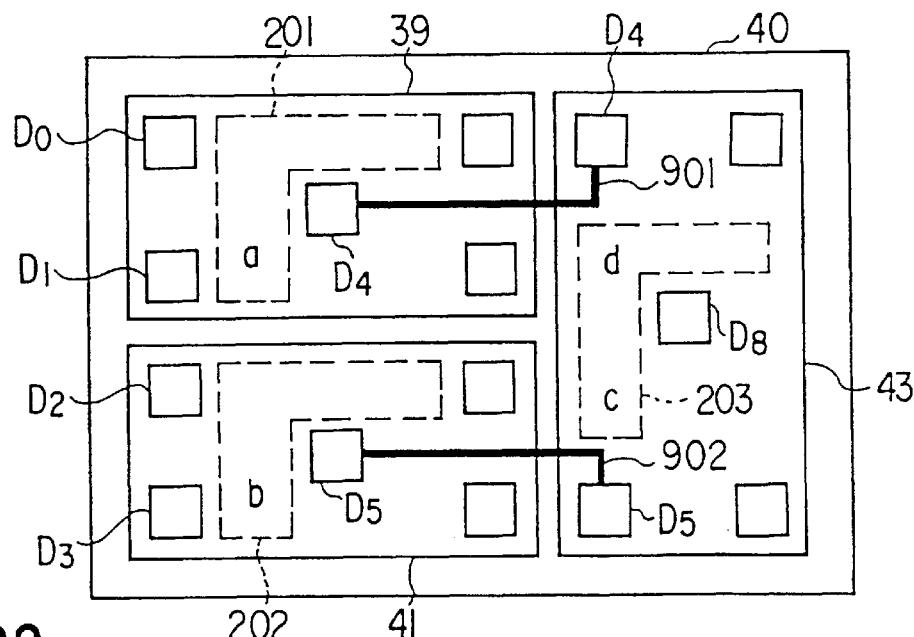
FIG. 22 is a block diagram showing an example in which a parity setting circuit is incorporated in a trimer-like data processing unit according to the present invention.

Further, in FIG. 22, a similar parity setting circuit is realized by a trimer-like data processing structure unit 40 and is trimer-like data processing structure units 39, 41, and 43. Needless to say, signals D0 to D8 in the circuits in FIGS. 22 and 23 correspond to each other. In addition, signal terminals D4 of the data processing structure units 39, 41, and 43 are respectively connected by connectors 901 and 902.

Figure 24:
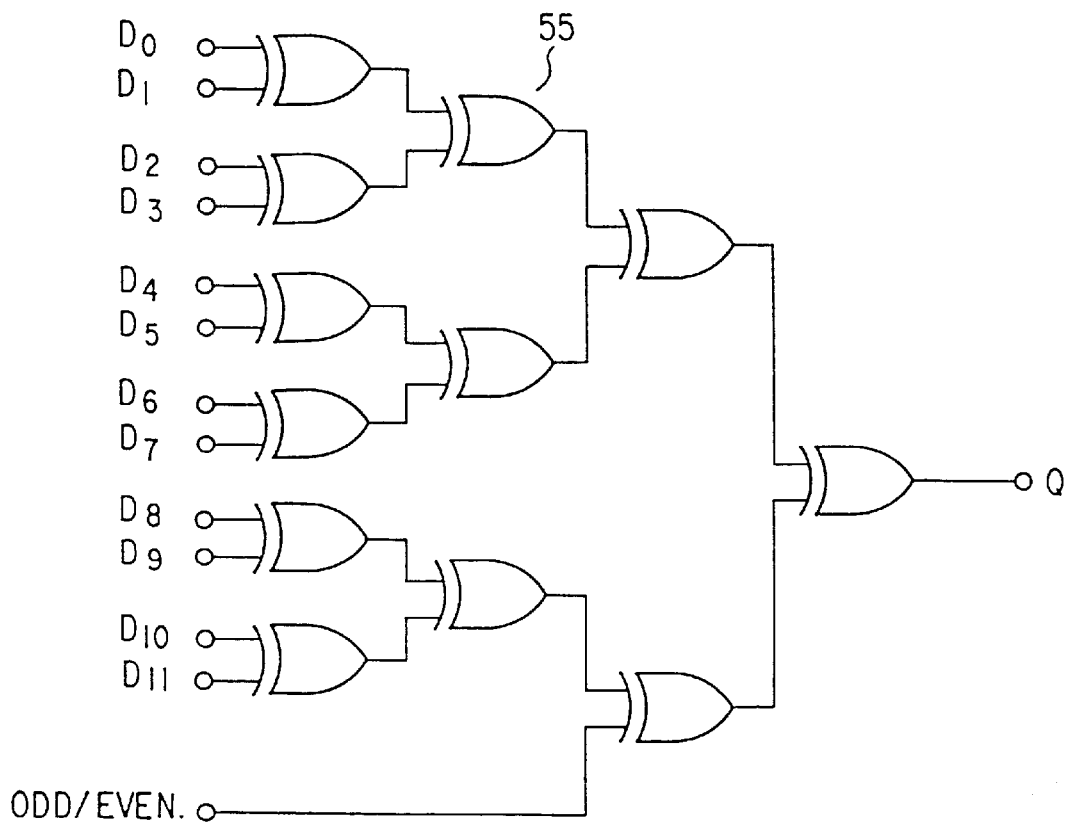
FIG. 24 is a circuit diagram showing an example of a parity setting circuit.

In addition, FIG. 24 shows an embodiment of another parity circuit. In this figure, parity circuits 55 can be layered in any stages. The example of the figure shows a case of four stages, and parity check of data of 12-bit is enabled. However, this kind of parity circuit can be easily incorporated in a structure having another logic circuit.

[Eighth Embodiment]

Figure 8:
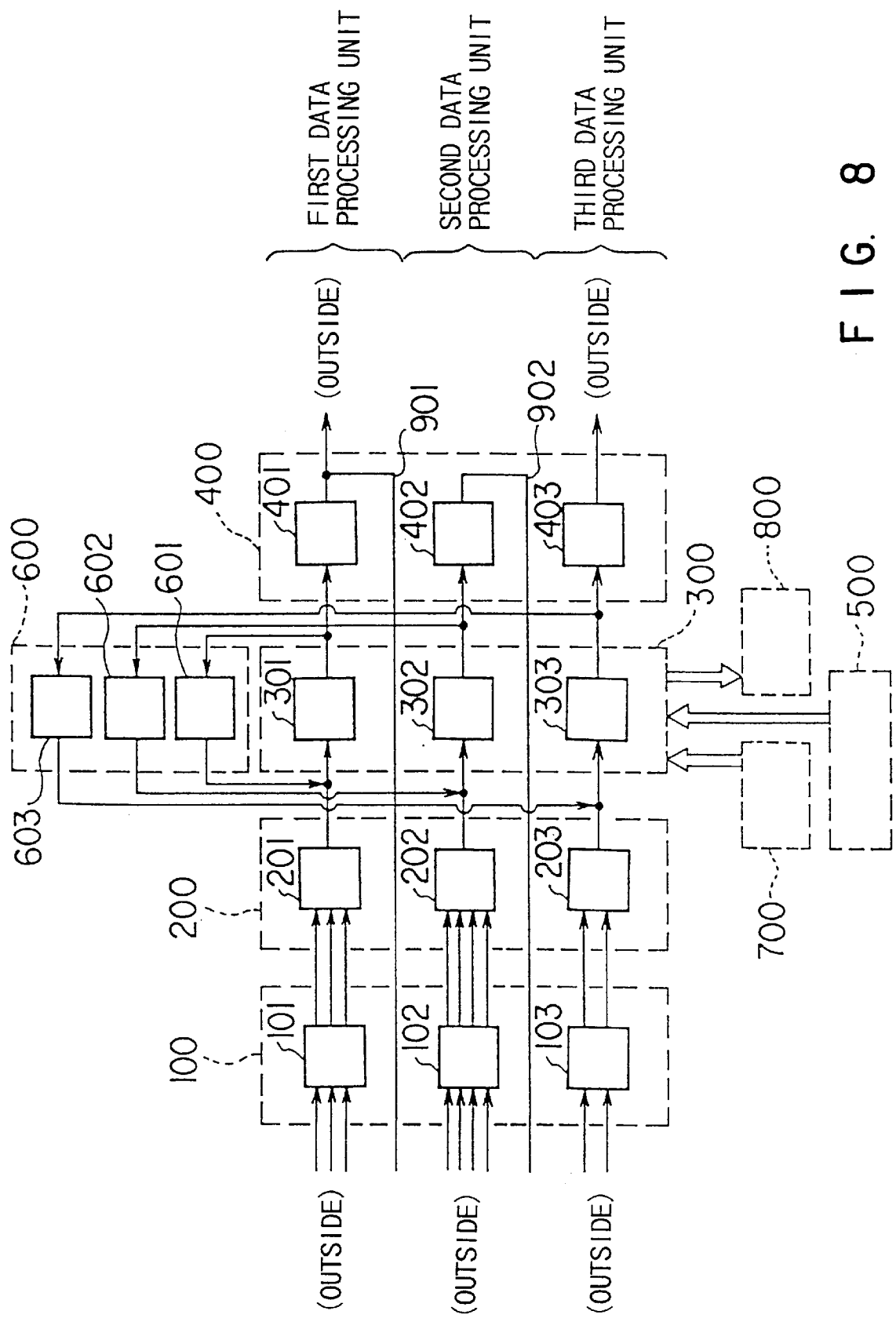
FIG. 8 is a block diagram showing a basic structure of a trimer-like data processing structure unit as an eighth embodiment according to the present invention.

FIG. 8 relates to an eighth embodiment of the present invention and is a block diagram showing a basic structure of a trimer-like data processing structure unit constructed by connecting first, second, and third data processing units (or memory structure units) in series. Three data processing units in this figure may be any of the data processing units according to the first to sixth embodiments. The three data processing units respectively have inputs 101, 102, and 103, operation circuits 201, 202, and 203, memory elements 301, 302, and 303, outputs 401, 402, and 403, and data reproduction circuits 601, 602, and 603.

Respective resources of the first, second, and third data processing units are collected together and indicated in as an input 100, an operation circuit 200, a memory 300 and an output means 400 by broken lines. In this manner, the units can be understood as one data processing unit as a whole. This respect is common to the case of the dimer-like data processing structure unit. Note that a controller 500 for controlling the memory elements 301, 302, and 303, a write circuit 700, and a read circuit 800 are indicated in collected form in the case of FIG. 7. A connector 901 electrically connects the output 401 of a first data processing unit with an input 102 of a second data processing unit, and a connector 902 electrically connects an output 402 of the second data processing unit with an input 103 of a third data processing unit. The connectors are normally wires made of a conductive material in a semiconductor device, as described before.

[Ninth Embodiment]

Figure 9:
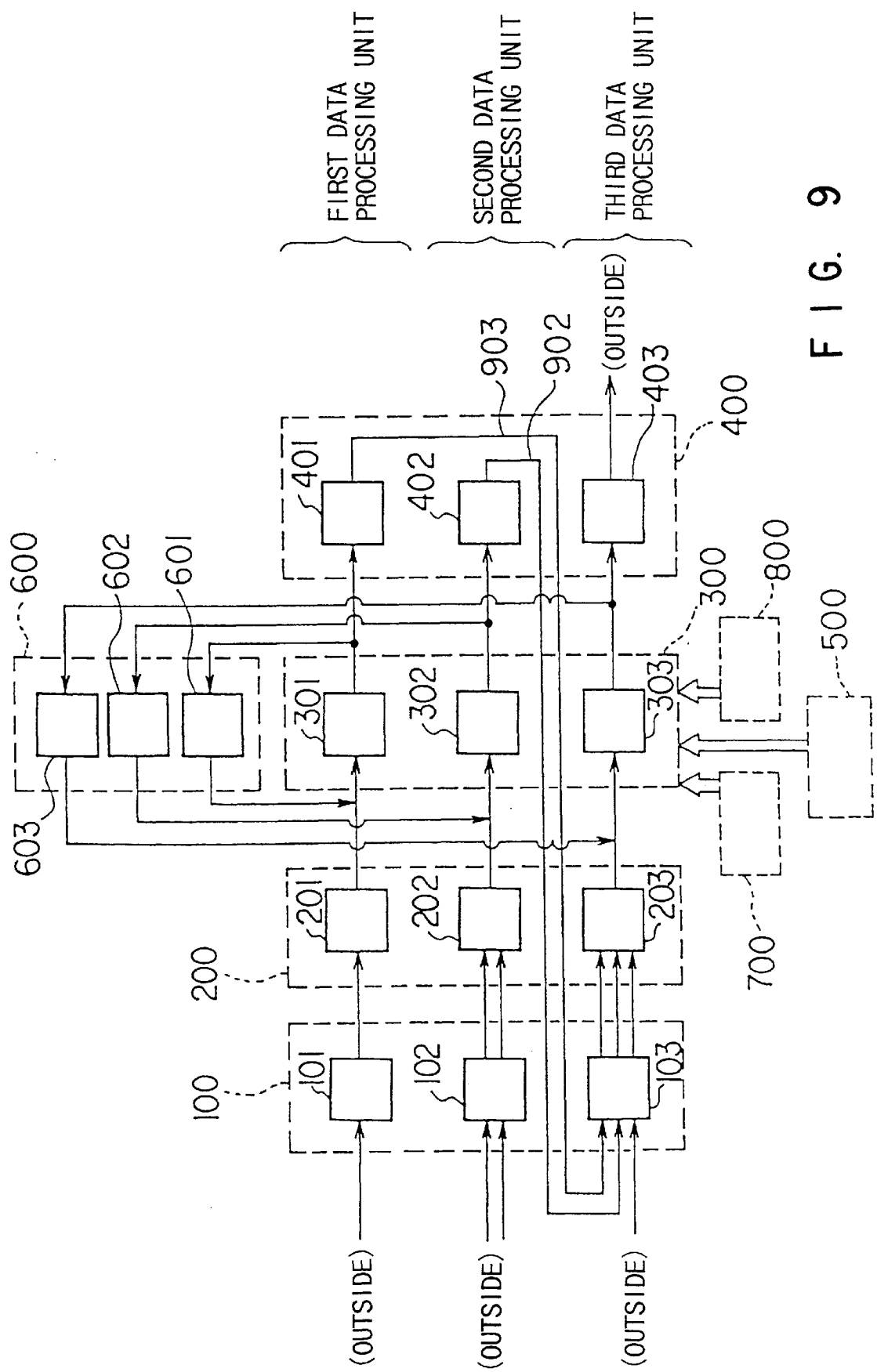
FIG. 9 is a block diagram showing a basic structure of another trimer-like data processing structure unit as a ninth embodiment according to the present invention.

FIG. 9 relates to a ninth embodiment according to the present invention and is a block diagram showing a basic structure of a trimer-like data processing structure unit equivalent to a modification of the eighth embodiment. The data processing unit structure in this figure is different from that of FIG. 8 in the point that first and second data processing units are connected in parallel to a third data processing unit. That is, outputs 401 and 402 of the first and second data processing units are electrically connected with an input of the third data processing unit through connectors 903 and 902, respectively. However, even in this case, this trimer-like data processing unit can be regarded as one data processing unit, as a whole, in which the input 100, operation circuit 200, memory 300, output 400, and controller 500 are essential elements while the data reproduction circuit 600, write circuit 700, and read circuit 800 are additional elements. Although the data processing structure in FIGS. 8 and 9 consists of three data processing units, it is apparent that four or more data processing units may constitute a data processing structure or a data processing structure unit which constitutes a data processing structure.

Thus, according to a trimer-like data processing structure unit or a higher polymer-like data processing structure unit, one operation process is decomposed into three or more operation process elements, and the elements are assigned to three or more operation circuits, so that the one operation process can be performed as a whole. This can hinder the area of a particular data processing unit from being excessively large in comparison with another data processing unit and leads to a physically well-balanced local structure, in such a polymer-like type data processing structure unit. In addition, according to this kind of structure unit, there is provided a design unit preferable for design of the entire data processing structure constructed by an array arrangement of a plurality of data processing units.

Figure 10:
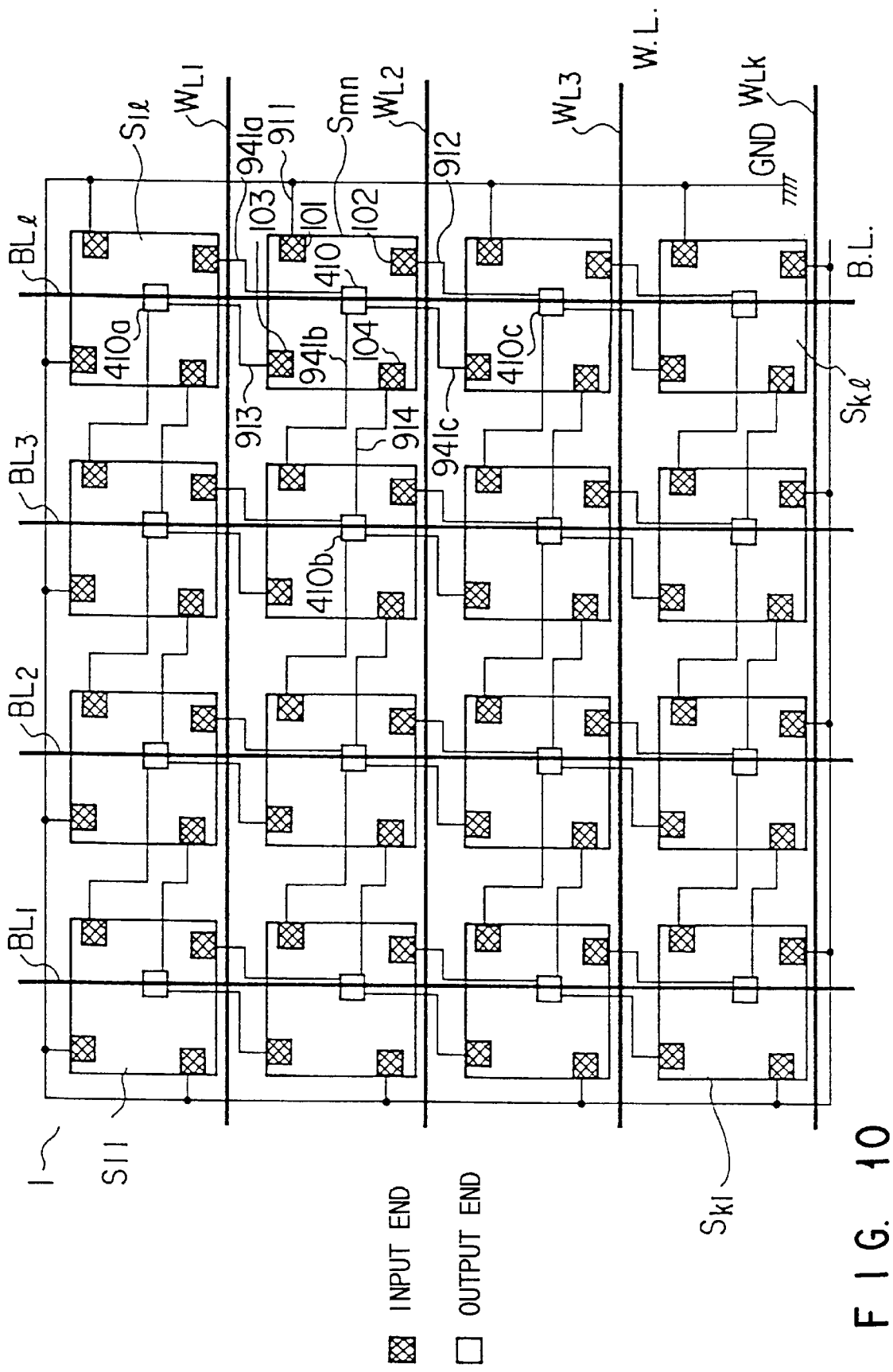
FIG. 10 is a view showing a main part of a data processing structure constructed by providing a data processing unit or a data processing structure unit.

FIG. 10 shows a main part of a data processing structure constructed by providing data processing units shown in FIGS. 1 to 6 or data processing structure units shown in FIGS. 7 to 9 at positions of S11 to Skl, like an array or matrix. Note that FIG. 10 can be understood as being illustrated such that the data processing structure units shown in FIGS. 7 to 9 are provided with a plurality of adjacent data processing units like the data processing units shown in FIG. 1 to 6.

In FIG. 10, like a memory cell array of a conventional semiconductor memory device, S11 to Skl exist at crosspoints between bit lines BL1 to BL1 and word lines WL1 to WLk, and a data processing unit or data processing structure provided at an arbitrary Smn unit is provided. Each data processing unit or data processing structure unit comprises four input ends 101 to 104, and a pad portion 410 which serves as an input end and also as an output end. The pad portion 410 is connected with the bit line BLm (i.e., BL1 in the figure) to respond to inputting/outputting of data from the outside, and is connected to input ends of adjacent data processing units or data processing s unit structure units through connection wires 941a, 941b, 941c . . . , to enable data inputting to the adjacent data processing units or data processing structure units from the outside. In addition, the four input ends 101 to 104 are connected to pad portions 410a, 410b, 410c, . . . of adjacent data processing units or data processing structure units through the connection wires 911 to 914, respectively, to receive data necessary for operation processing. In the embodiment shown in this figure, the input ends (e.g., 101) of the data processing unit or data processing structure unit positioned at an end portion of a matrix image-fixed by positions S11 to Skl are grounded.

Note that k=4 and l=4 exist in FIG. 10 and total sixteen pieces of S are therefore found. However, the present invention is not limited to this specific embodiment. In addition, the number and arrangement of input ends or a pad portion as an input comprised in a data processing unit Smn or a data processing structure unit Smn at an arbitrary position are not limited to the embodiment shown in this figure.

Figure 11:
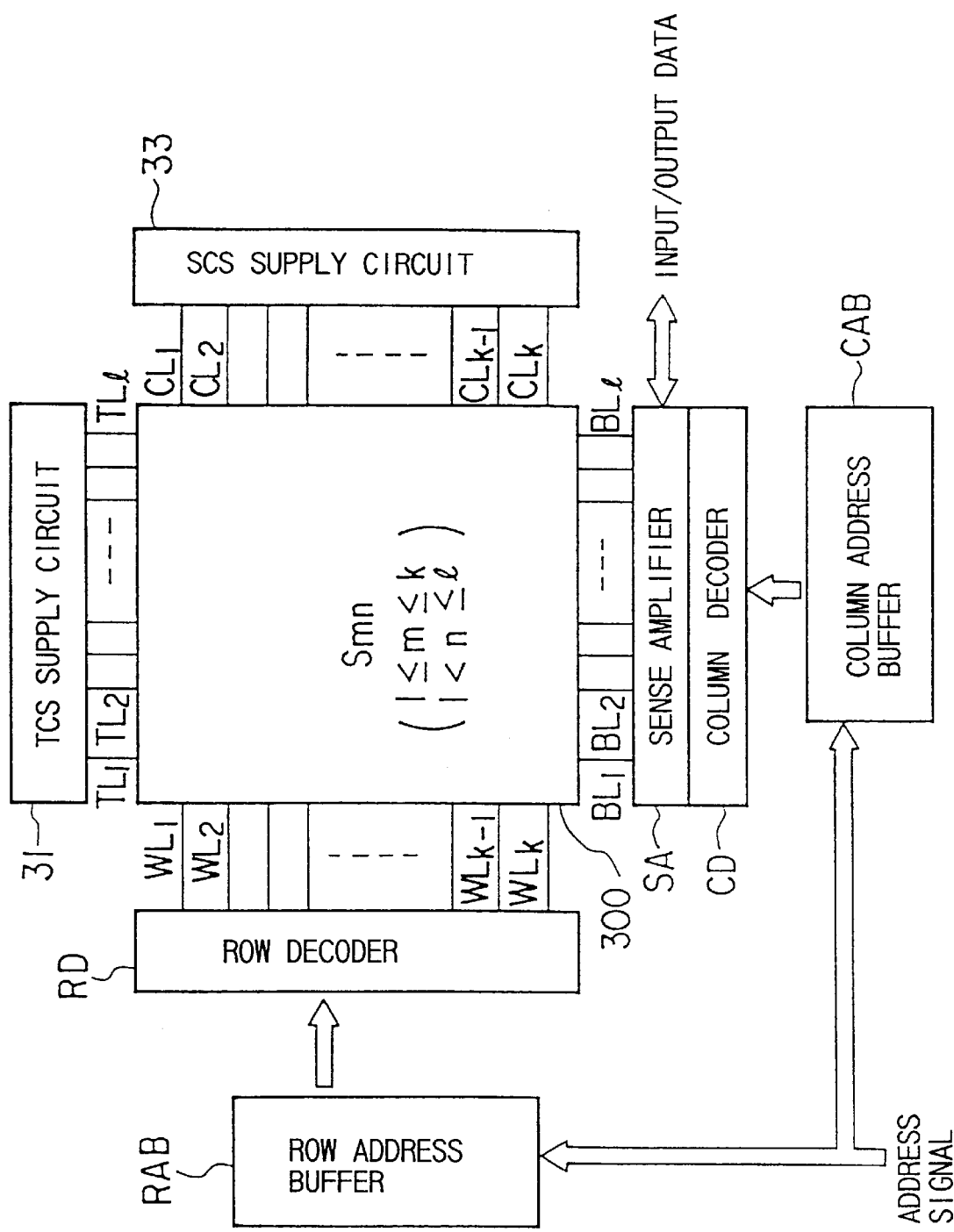
FIG. 11 is an entire view of the data processing structure unit incorporating a main part of the data processing structure shown in FIG. 10.

FIG. 11 is a view showing the entire semiconductor memory device incorporating a main part of the data processing structure shown in FIG. 10. In FIG. 11, a plurality of matrix-like memory means memories elements 300 are connected to a TCS supply circuit 31 through connection lines TL1 to TLl, to a row decoder RD through word lines WL1 to WLk, to a SCS supply circuit 33 through connection lines CL1 to CLk, and to a sense amplifier SA and a column decoder CD through bit lines BL1 to BLl. Further, the row decoder RD is connected to a row address buffer RAB and the column decoder CD is connected to a column address buffer CAB.

In the structure described above, the regions of the data processing unit Smn or data processing structure unit Smn are arranged like a matrix as shown in FIG. 10. The structure is similar to a conventional semiconductor memory device, in the points that an arbitrary address of the data processing unit Smn or data processing structures Smn is designated through the row address buffer and row decoder RD as well as through the column address buffer, and the column decoder CD and data stored in the memory at the address is read out to the outside by the sense amplifier SA or data is written at an arbitrary address Smn designated.

The embodiment according to the present invention is characterized by including a TCS supply circuit for supplying a memory operation control signal TCS is for controlling the operation of storing, reading, and writing in the memory 3 mn of the data processing unit Smn or data processing structure unit Smn arranged at an arbitrary address, as a controller 6 mn to the data processing unit or data processing structure unit is through the signal supply line TLn, and a SCS supply circuit for supplying a selector operation control signal SCS for controlling the operation of the selector 22 mn of the data processing unit or data processing structure unit provided at an arbitrary address Smn, as a selection controller 23 mn, to the data processing unit or data processing structure unit through the signal supply line CLn. In the figure, the TCS supply circuit and SCS supply circuit supply signals through a TLn parallel to column lines BLn and CLn parallel to row lines WLn. However, TLn and CLn need not be arranged respectively in the column line direction and the row line direction. Although another embodiment according to the present invention, shown in FIG. 12, is a typical example, connection lines CL1 to CLk need not be provided if there is another portion which performs a function equivalent to the SCS supply circuit 33.

Note that respective circuits constituting the data processing structure unit shown in FIG. 11 is timing-controlled with reference to a base clock signal not shown.

Figure 12:
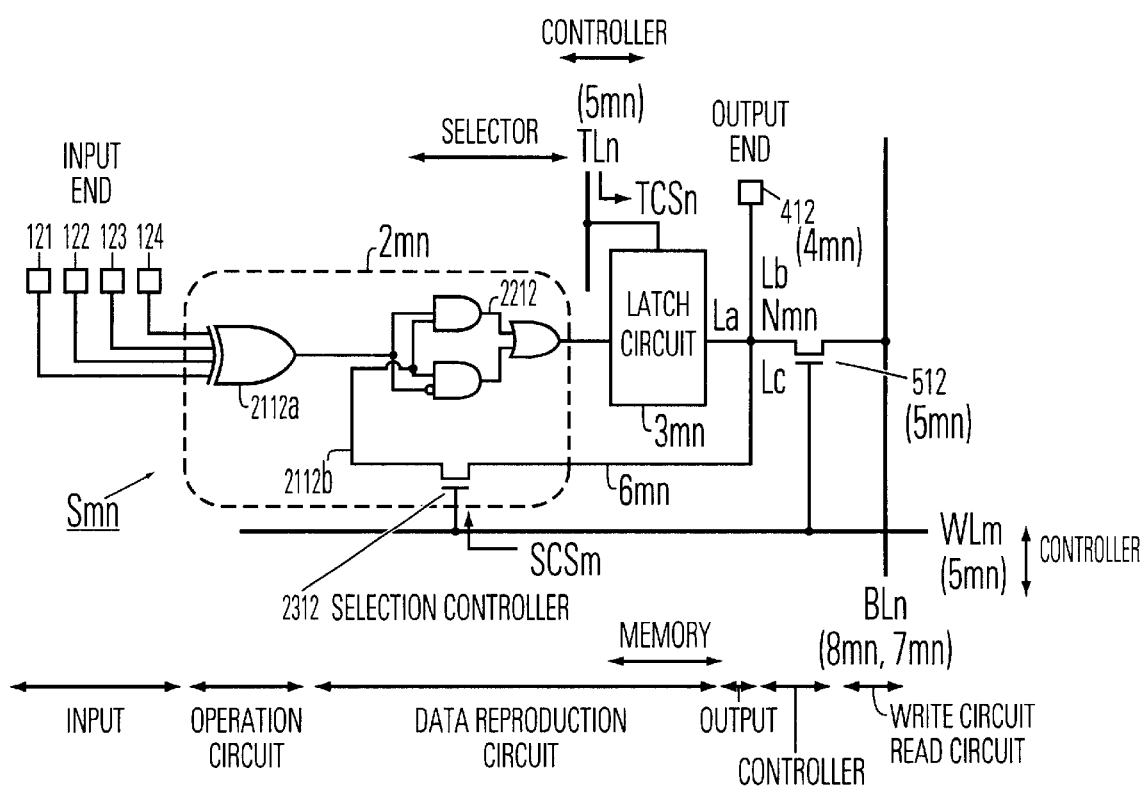
FIG. 12 is a view showing a specific example of a data processing unit provided at an arbitrary position in FIG. 10.

FIG. 12 shows a specific example of a data processing unit provided at an arbitrary position Smn in FIG. 10.

The data processing unit at this portion comprises input ends 121 to 124, an output end 412, a bit line BLn, and a word line WLm, as shown in FIG. 10, and many elements cited below, which are not shown in FIG. 10, are shown. The elements are include an operation circuit 2 mn ; a data reproduction circuit 6 mn ; a latch circuit 3 mn as a memory element ; a latch trigger line TLn for inputting, to the latch circuit, a latch trigger signal which is a part of a controller 6 mn for controlling operation of the latch circuit (which normally is storing of data, writing of data from the outside, and reading of data to the outside, and mainly is storing of data and writing of data from the outside in case of FIG. 12) or timings of the operation and which is necessary for the control, and more normally, a component TCSn of the memory operation control signal TCS (shown in FIG. 11) which corresponds to an n-th column ; and a connection switch element 512 which enables connection between a bit line BLn and a connection node Nmn existing at a crosspoint between an output line La of the latch circuit, a lead line Lb to the output end 412, and a wire Lc connected to the operation circuit 2 mn and data reproduction circuit 6 mn. Further, the elements are an operation circuit 2 mn comprising an operation circuit (which is an exclusive OR circuit) 2112a for operating first data inputted from the input ends 121 to 124 to generate a candidate of second data which can be stored in the latch circuit 3 mn, and an identification logic circuit 2112 for reproducing an output of the second data from the latch circuit 3 mn, as a candidate of the second data; a selector 2212 for selecting second data to be stored in the latch circuit 3 mn in accordance with the latch trigger signal TCS among outputs from the operation circuit; and a selection controller 2312 for controlling operation of the selector 2212. The selector 2212 operates such that the output of the identification logic circuit 2112b is selected when the selection controller 2312 is ON and the output of the exclusive OR circuit 2112a is selected when the selection controller 2312 is OFF.

The word line WLm is a part of the controller 5 mn from the point of controlling operation of the connection switch element 512, and also is a part of the selection controller from the point of controlling operation of the selection controller 2312. The bit line BLn is a part of a write circuit 7 mn from the point of writing third data from the outside as second data into the latch circuit 3 mn, and also is a part of the read circuit 8 mn from the point of outputting second data from the latch circuit 3 mn to the outside.

Second data stored in the latch circuit 3 mn is outputted and read out to the bit line BLn through an output line La from the latch circuit regardless of the latch trigger signal TCS inputted on the latch trigger line TLn when the connection switch element 512 is turned ON in accordance with a trigger signal inputted on the word line WLm. In this time, the second data outputted can also be read out to the outside from the output end 412. In addition, in this time, the switch element constituting the controller 2312 is simultaneously turned on, so that the second data can be stored again into the latch circuit activated by the data reproduction circuit 6 mn or the identification operation circuit 2112b through the wire Lc and further by the latch trigger signal TCSby through the selector 2212.

The trigger signal inputted by the word line WLm described above is considered as that component SCSm of the selector operation control signal SCS (shown in FIG. 11) which corresponds to a m-th row and which finally controls the selector 2212 by controlling the selection controller 2312. From this meaning, in this embodiment, it can be said that the word line WL serves also as a selection command line SL.

The third data inputted on the bit line BLn from the outside is written as second data into the latch circuit from the bit line BLn through the connection node Nmn, the wire La, the data reproduction circuit 6 mn or identification operation circuit 2112b, and the selector 2212, i.e., along the substantially same route as the flow of data in the case of reproducing data of the latch circuit 3 mn, where the connection switch element 512 and the switch element constituting the selection controller 2312 are turned Onon in accordance with the trigger signal inputted on the word line WLm.

Although FIG. 12 illustrates one single data processing unit, a polymer-like data processing structure unit can be constructed by connecting the output end 412 in this figure with an input end of another data processing unit, preferably with an input end of an adjacent data processing unit, or more preferably with an input end of the most adjacent data processing unit, through an electric connector such as a metal wire or conductive polysilicon. Needless to say, a data processing structure is formed by further connecting a plurality of data processing structure units of this kind through an electric connector.

Next, operation of the data structure unit shown in FIG. 12 will further be explained with reference to a time chart shown in FIG. 13. For convenience of understanding, FIG. 13 defines a case of a high wave height as an active state, but a case of a low wave height may be actually defined as an active state. Although this figure illustrates three operation modes as being sequential on the time axis, this is only an example and the modes may actually be independent from each other.

In a mode in which data from the outside is written, or in other words, in a mode in which third data inputted from the outside is stored as second data, an address signal is inputted to an address signal terminal (not shown in FIG. 12) like a conventional semiconductor memory device. In this address signal, the data processing unit or data processing structure unit at an arbitrary region Smn at an arbitrary cross-position between a word line WLm and a bit line BLn is designated as a write target through a row buffer and a row decoder as well as a column address buffer and a column decoder (a1). Meanwhile, data to be written from a data input terminal (not shown in FIG. 12) is inputted onto a bit line BLn (a2). When a memory operation control signal TCSn as a write command of data is inputted to the latch trigger line TLn and the latch circuit 3 mn is activated into a writable state (a3), the data is stored into the latch circuit through a connection switch element 512, a connection node Nmn, a wire La, a data reproduction circuit 6 mn or identification logic circuit 2112b, and a selector 2212. Second data stored in the latch circuit 3 mn is outputted from the output end 412 to the outside (including an input end or input of another data processing unit) (a4).

In a mode in which reading to the outside is performed, or in other words, in a mode in which second data is outputted to the outside by a read circuit such as a bit line BLn, a data processing unit or data processing structure unit at a cross-position between a word line WLm and a bit line BLn is designated by an address signal (b1). Further, data stored in the data processing unit or data processing structure unit is read out as a potential of the connection node Nmn on the bit line BLn by a sense circuit (b2).

In an inputting/operating/storing/outputting mode as a further another mode, four kinds of first data items to be operated are inputted simultaneously or substantially simultaneously to the input ends 121 to 124 from the outside (c1). Note that inputting of first data from an input end (c1, d1, e1, f1) and outputting of second data from an output end (a4, c3, d3, e3) occur substantially at the same time, where a time delay caused by operation, selection of an operation result, and storing of selected data is not considered or is negligibly small.

First data inputted at a timing of C1 is operated and processed by the exclusive OR circuit 2112a, and the operation result thereof is inputted to the selector 2212, together with an output of the identification logic circuit 2112b. The selector 2212 outputs the operation result of the exclusive OR circuit 2112a when the selection controller 2312 is OFF, and outputs the output of the identification logic circuit 2112b when the selection controller 2312 is ON, as second data toward the latch circuit 3 mn. Storing of the second data to the latch circuit 3 mn is performed when a memory operation control signal TCSn is inputted as a write command of data into the latch trigger line TLn and the latch circuit 3 mn is activated into a writable state (c2). In this time, the potential of the connection node Nmn corresponds to the second data stored in the latch circuit Nmn, and therefore, data equivalent to the second data is outputted to the outside from the output end 412 (c3). The second data outputted from the output end 412 to the outside can be inputted as first data into an input end or input of another data processing unit or data processing structure unit, or preferably, an adjacent data processing unit or data processing unit, through an appropriate electric connector 9 (e.g., 901 and 902 in FIG. 8 and 902 and 903 in FIG. 9).

Like the explanation described above, when inputting of first data from input ends 121 to 124 subsequently occurs (d1, e1, f1, . . . ), data equivalent to the second data is outputted to the outside from an output end 401 (c3, d3, e3, . . . ) where the latch circuit 3 mn is activated into a writable state (d2, e2, f2, . . . ).

Figure 14:
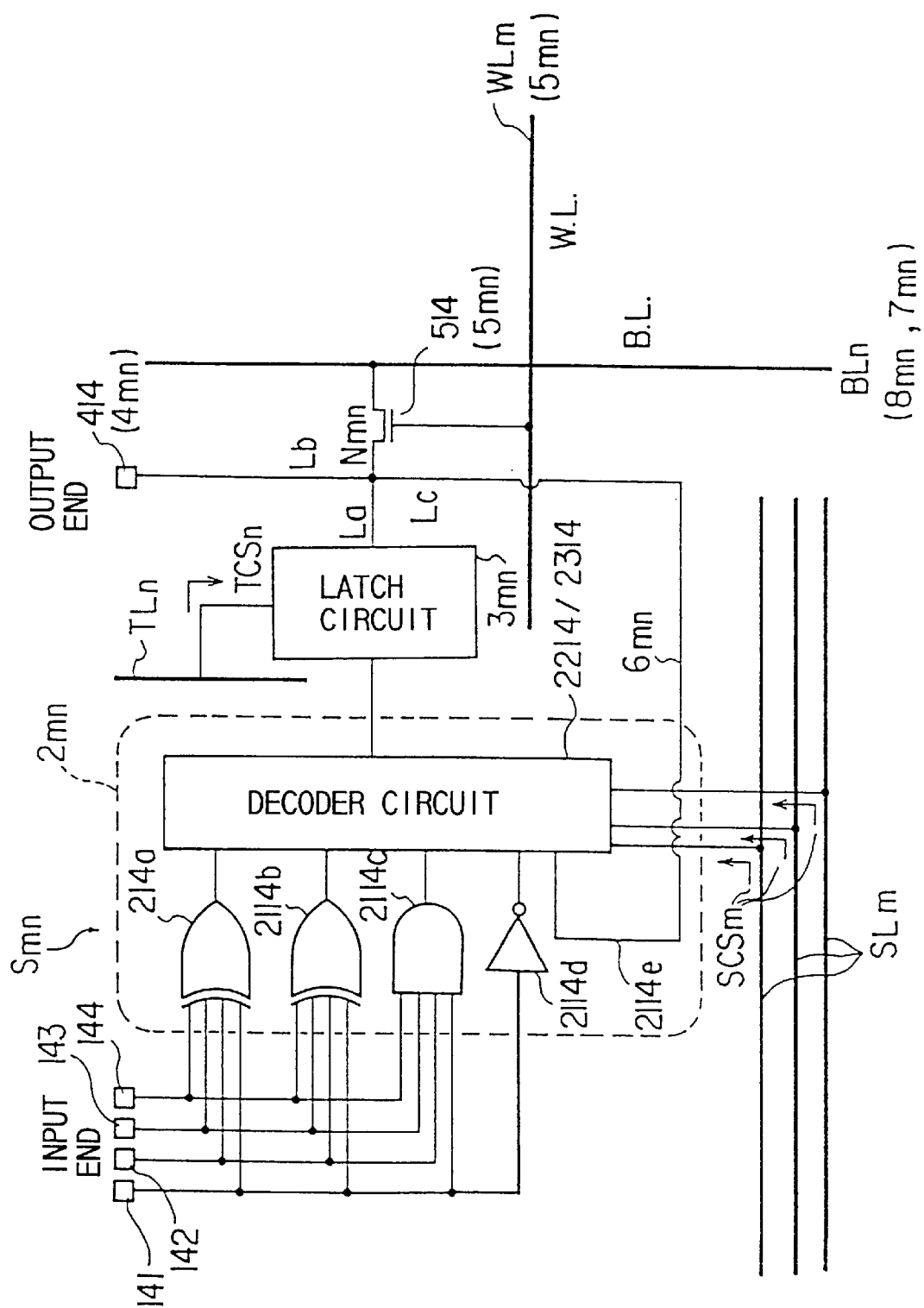
FIG. 14 is a view showing another specific example of the data processing unit provided at an arbitrary position in FIG. 10.

FIG. 14 shows another specific example of a data processing unit provided at an arbitrary position Smn in FIG. 10. This specific example is complicated more than the specific example shown in FIG. 12, and is different therefrom in the point of using a decode circuit as a selector to control the means selection by a selection control signal on the command line.

Figure 13:
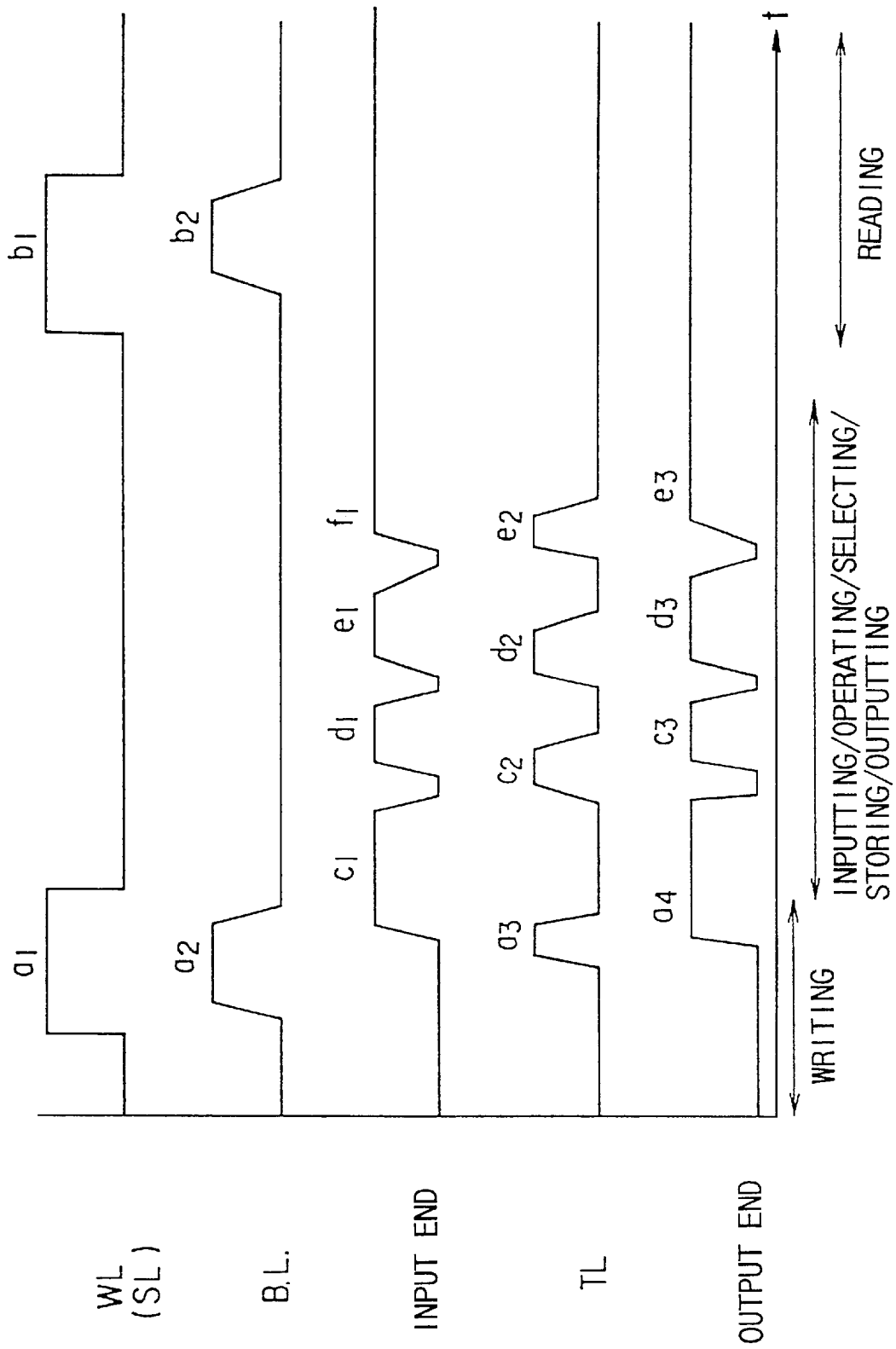
FIG. 13 is a time chart showing operation of the data structure unit shown in FIG. 12.

The data processing unit shown in FIG. 14 comprises input ends 141 to 144, an output end 414, a bit line BLn, a word line WLm, and further comprises an operation circuit 2 mn, a data reproduction circuit 6 mn, a latch circuit 3 mn as a memory element, a latch trigger line TLn for inputting, to the latch circuit, a latch trigger signal which is a part of a controller 5 mn for controlling operation of the latch circuit (which normally is storing of data, writing of data from the outside, and reading of data to the outside and mainly is storing of data and writing of data from the outside in case of FIG. 13) or timings of the operation and which is necessary for the control, and more normally, a component TCSn of the memory operation control signal TCS (shown in FIG. 11) which corresponds to an n-th column, and a connection switch element 514 which enables connection between the bit line BLn and a connection node Nmn existing at a cross-point between an output line La of the latch circuit, a lead line Lb to the output end 414, and a wire Lc connected to the operation circuit 2 mn and data reproduction circuit 6 mn. Further, comprised are a group of logic operation circuits comprising an exclusive OR circuit 2114a, a OR circuit 2114b, a NAND circuit 2114c, an inversion logic circuit 2114d, and an identity logic circuit 2114e. Respective logic operation circuits except for the identity logic circuit 2113e operate on first data inputted from the input ends 141 to 144, to generate a candidate of second data which can be stored into the latch circuit 3 mn. Further, there is provided a decoder circuit 2214 as a selector for selecting second data to be stored in the latch circuit 3 mn in accordance with the latch trigger signal TCS. The identity logic circuit 2114e in this figure has a function of reproducing an output of second data from the latch circuit 3 mn, as a candidate of second data. The decoder circuit 2214 has not only the function as a selector, but also has a function as a selection controller 2314 for controlling the operation as the selector, driven by that component SCSm of the selector operation control signal SCS which corresponds to a m-th row, inputted through SLm as a m-th row component of a selection command line SL. To summarize, an arbitrary operation result can be selected as second data to be stored in the latch circuit 3 mn, by controlling the decoder circuit 2214/2314 by the selector operation control signal SCSm.

Although three selection command lines SLm are illustrated in FIG. 14, selection of eight kinds of outputs of logic operation circuits at most can be performed by the decoder circuit 2214/2314 where there are three command lines. However, in a more practical embodiment, since a data processing structure unit is designed under a requisite of not excessively increasing the area occupied by a region Smn on a semiconductor substrate, a data processing unit or data processing structure unit is constructed by logic operation circuits less than eight.

Like the case of the embodiment shown in FIG. 12, the following can be applied to the embodiment shown in FIG. 14. The word line WLm is a part of the controller 5 mn from the point of controlling operation of the connection switch element 514. The bit line BLn is a part of a write circuit 7 mn from the point of writing third data from the outside as second data into the latch circuit 3 mn, and also is a part of a read circuit 8 mn from the point of outputting second data from the latch circuit 3 mn to the outside. Second data stored in the latch circuit 3 mn is read out to the bit line BLn through an output line La from the latch circuit regardless of the latch trigger signal TCS inputted on the latch trigger line TLn when the connection switch element 514 is turned ON in accordance with a trigger signal inputted on the word line WLm. In this time, the second data read out can also be read out to the outside from the output end 414. In addition, the second data can be stored again into the latch circuit 3 mn activated by the latch trigger signal TCS, through the decoder circuit 2214/2314 controlled by the data reproduction circuit 6 mn or the identification operation circuit 2112e through the wire Lc and further by the signal SCSm on the selection command line SLm.

The third data inputted on the bit line BLn from the outside is written as second data into the latch circuit 3 mn from the bit line BLn through the connection node Nmn, the wire La, the data reproduction circuit 6 mn or the identification operation circuit 2114b, and the decoder circuit 2214/2314, i.e., along the substantially same route as the flow of data in case of reproducing data of the latch circuit 3 mn, where the connection switch element 512 in accordance with the trigger signal inputted on the word line WLm and the decoder circuit 2214/2314 is activated.

Although FIG. 14 illustrates one single data processing unit like the case of FIG. 12, a polymer-like data processing structure unit can be constructed by connecting the output end 414 in this figure with an input end of another data processing unit, preferably with an input end of an adjacent data processing unit, or more preferably with an input end of the most adjacent data processing unit, through an electric connector such as a metal wire or conductive polysilicon.

Figure 15:
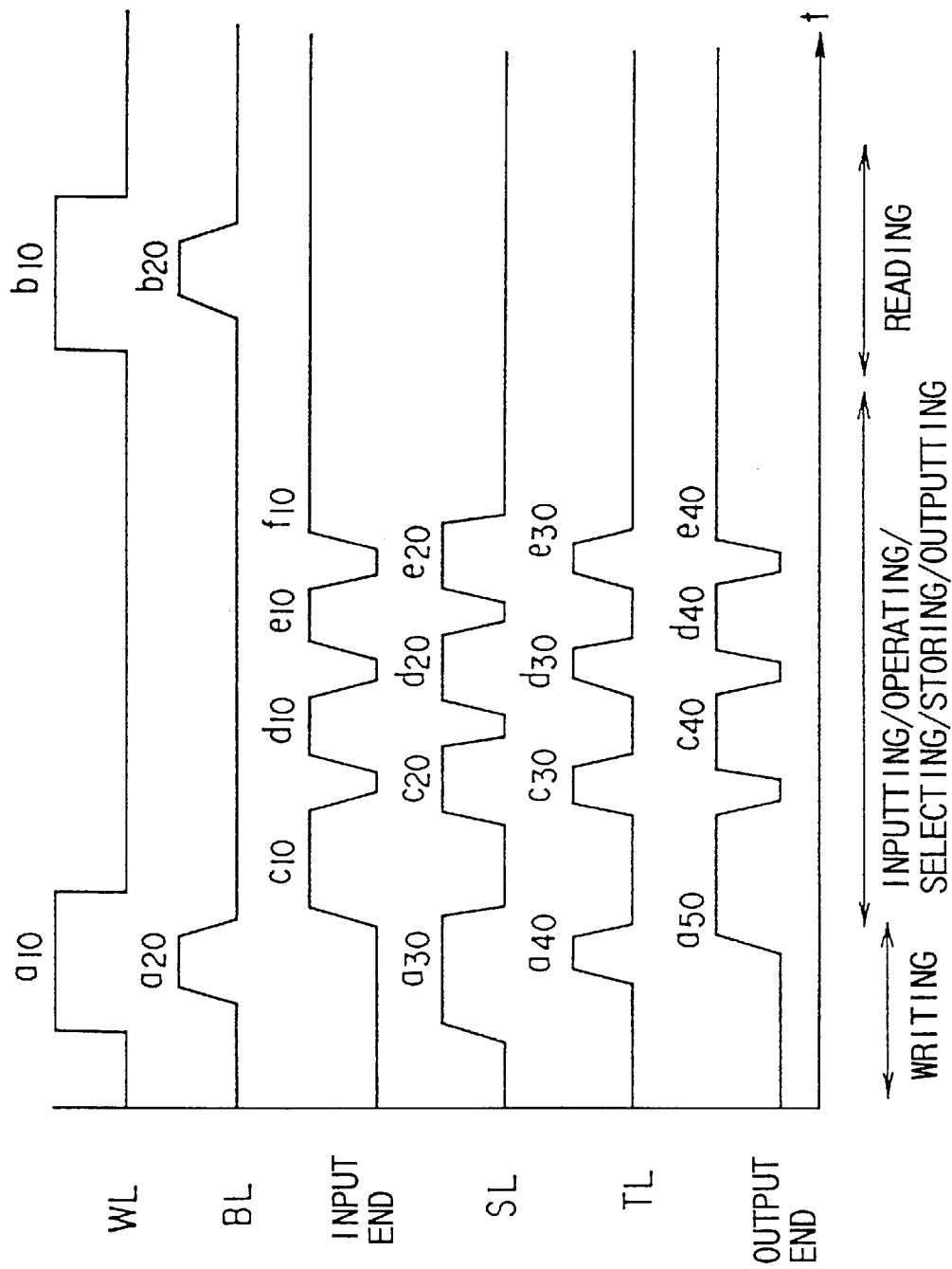
FIG. 15 is a time chart showing operation of the data structure unit shown in FIG. 14.

Next, the operation of the data structure unit shown in FIG. 14 will further be explained with reference to a time chart shown in FIG. 15. For convenience of understanding, FIG. 15 defines a case of a high wave height as an active state like the case of FIG. 13, but a case of a low wave height may be actually defined as an active state. Although this figure illustrates three operation modes as being sequential on the time axis, this is only an example and the modes may actually be independent from each other.

In a mode in which data from the outside is written, an address signal is inputted to an address signal terminal (not shown in FIG. 14). By this address signal, the data processing unit or data processing structure unit at an arbitrary region Smn at an arbitrary cross-position between a word line WLm and a bit line BLn is designated as a write target through a row buffer and a row decoder as well as a column address buffer and a column decoder (a10). Meanwhile, data to be written from a data input terminal (not shown in FIG. 14) is inputted onto a bit line BLn (a20). The data is stored as second data into the latch circuit through a connection switch element 512, a connection node Nmn, a wire La, a data reproduction circuit 6 mn or an identity logic circuit 2112b, and a decoder circuit 2214/2314, when a memory operation control signal TCSn as a write command of selected data is inputted to a latch trigger line TLn, the latch circuit 3 mn is activated into a writable state (a40), a selection control signal SCSm as a selection command of an identification logic operation result is further inputted to the decoder circuit 2214/2314, and the decoder circuit is activated (a30). Data equivalent to the second data can be outputted through an output end 414 to the outside (a50).

In a mode in which reading to the outside is performed, a data processing unit or data processing structure unit at a cross-position between a word line WLm and a bit line BLn is designated by an address signal (b10). Further, data stored in the data processing unit or data processing structure unit is read out as a potential of the connection node Nmn on the bit line BLn by a sense circuit (b20).

In an inputting/operating/storing/outputting mode, four kinds of first data items to be operated are inputted simultaneously or substantially simultaneously to input ends 141 to 144 from the outside (c10). Note that inputting of first data from an input end (c10, d10, e10, f10) and outputting of second data from an output end (a50, c40, d40, e40) occur substantially at the same time, where a time delay caused by operation, selection of an operation result, and storing of selected data is not considered or is negligibly small.

Figure 16A:
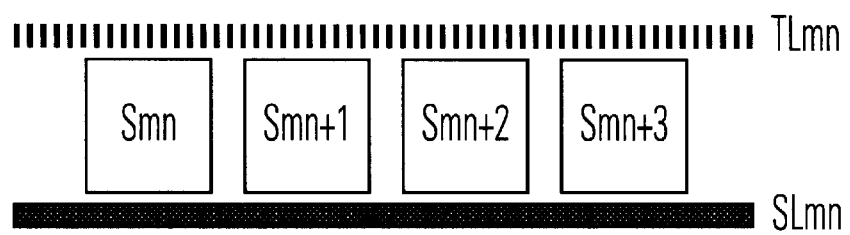
FIGS. 16A, 16B, and 16C are circuit configurations showing respective examples of a data processing unit or data processing unit structure according to the present invention.
Figure 16B:
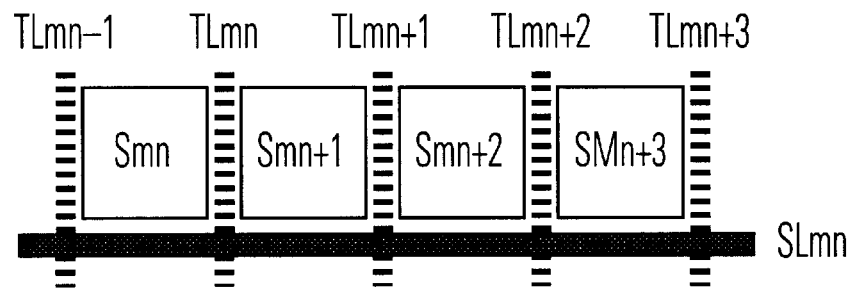
Figure 16C:
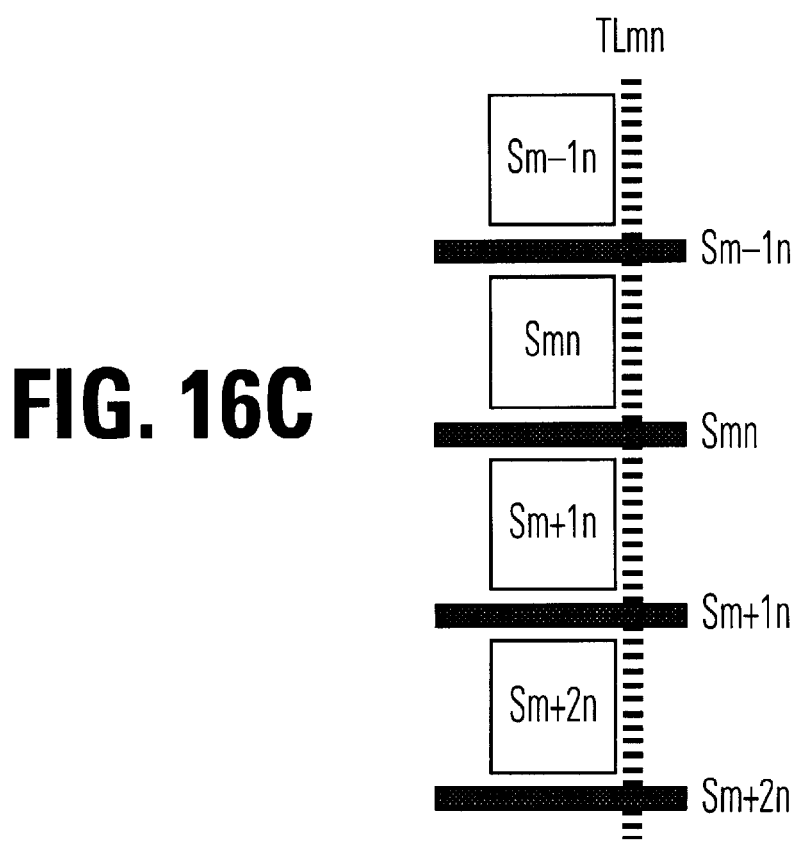

First data inputted from the input ends 141 to 144 is processed by a group of logic operation circuits 2114a to 2114d except the identity operation circuit 2114e, and respective operation results are inputted to the decoder circuit 2214/2314, together with the operation result of the identity circuit 2114e. The decoder circuit 2214/2314 is controlled by a selection command signal SCSm on a selection command line SLm, and outputs an arbitrary logic operation result as second data to the latch circuit 3 mn (c20). Storing of the second data into the latch circuit 3 is generally carried out when a memory operation control signal TCSn as a write command of data is inputted into the latch trigger line TLn and the latch circuit 3 mn is activated into a writable state (c30). Since the potential of the connection node Nmn in this time corresponds to the second data stored in the latch circuit 3 mn, data equivalent to the second data is outputted to the outside from the output end 412 (c40). The second data outputted from the output end 401 to the outside can be inputted as first data into an input end or input of another data processing unit or data processing structure unit, or preferably, an adjacent data processing unit or data processing unit, through an appropriate electric connector 9 (e.g., 901 and 902 in FIG. 8 and 902 and 903 in FIG. 9). Like the explanation described above, when inputting of first data from the input ends 121 to 124 subsequently occurs (d10, e10, f10, . . . ), the decoder circuit 2214/2314 performs selection operation (d20, e20, f20, . . . ) Further, data equivalent to the second data is outputted to the outside from the output end 401 (d40, e40, f40, . . . ) where the latch circuit 3 mn is activated into a writable state (d30, e30, f30, . . . ) FIGS. 16A, 16B, and 16C are circuit configurations showing examples of a data processing unit or data processing unit structure according to the present invention. In each of FIGS. 16A, 16B, and 16C, arbitrary selection command lines SLmn, latch trigger lines TLmn, and the arrangement relationship thereof with regions Smn are shown. Although a region Smn is provided with a data processing unit or a data processing structure unit as described above, a plurality of data processing units or data processing structure units, e.g., two, three, or more units may be provided for one (common) selection command line or latch trigger line.

FIG. 16A shows a case where a selection command line SLmn and a latch trigger line TLmn are used in common in data processing units or data processing structure units in arbitrary regions arranged in the row direction. FIG. 16B shows a case where selection command lines SLin are used in common in data processing units or data processing structure units in arbitrary regions arranged in the row direction. In addition, FIG. 16C shows a case where selection command lines SLmn are arranged in a row direction and latch trigger lines TLmn are used in common in data processing units or data processing structure units in arbitrary regions arranged in the column direction.

In these examples, all the adjacent data processing units or data processing structure units need not be connected to a common command line (i.e., selection command line and/or latch trigger line). Every other unit may be arranged in common, or a plurality of data processing units or data processing structure units provided at a more interval may be connected to a common command line.

Figure 17:
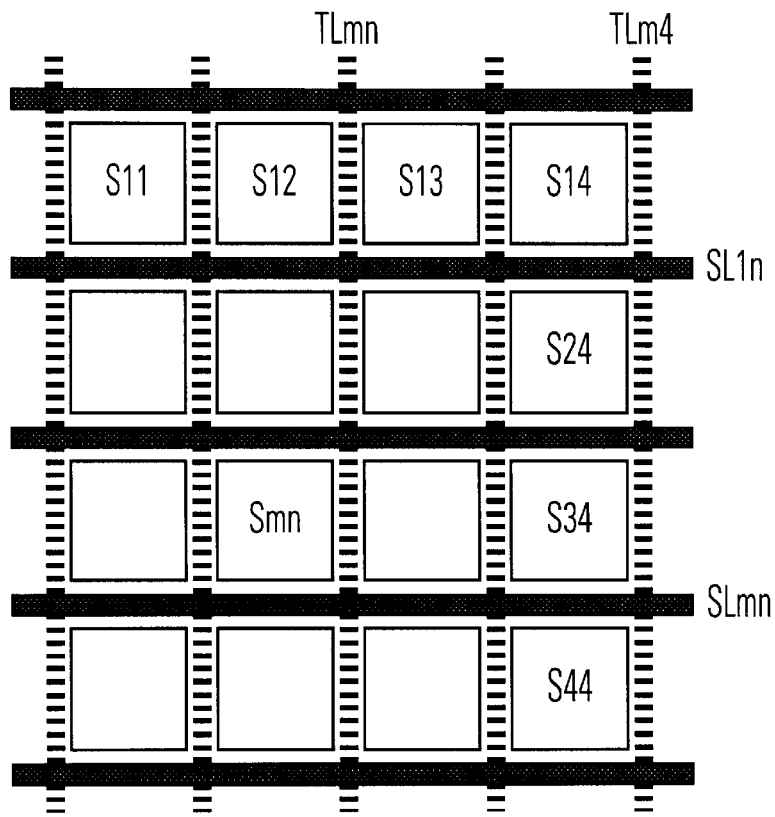
FIG. 17 is a circuit configuration showing each example of a data processing unit or data processing unit structure according to the present invention.
Figure 18:
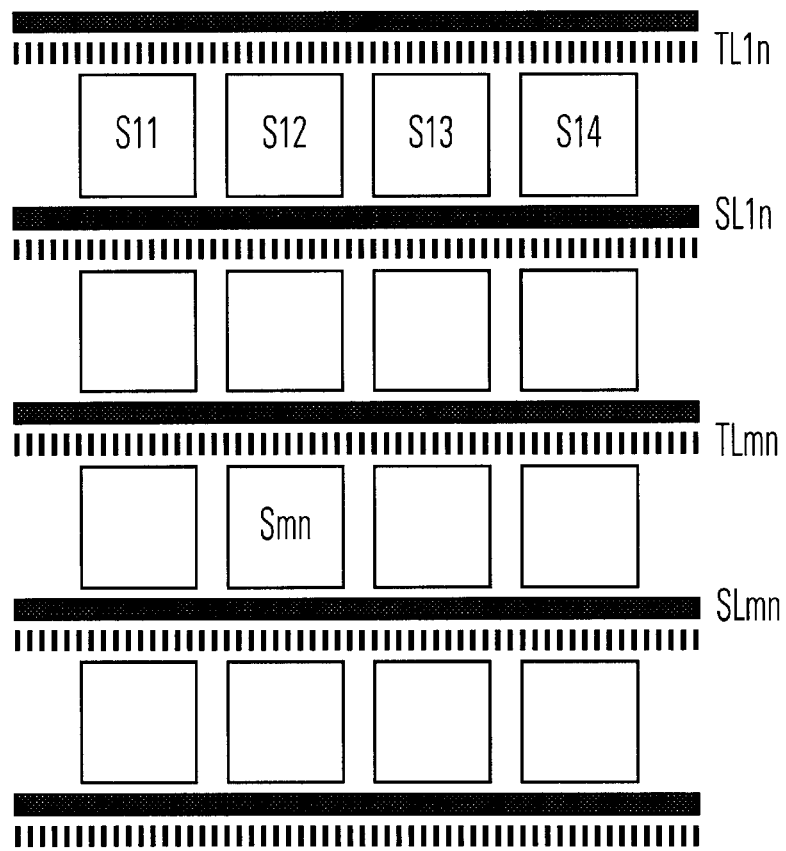
FIG. 18 is a circuit configuration showing each example of a data processing unit or data processing unit structure according to the present invention.

In addition, FIGS. 17 and 18 respectively show structure examples of data processing units or data processing structure units according to the present invention.

FIG. 17 adopts a structure in which selection command lines SLmn and latch trigger lines TLmn cross each other and arbitrary regions Smn are arranged at cross-positions thereof. For example, data processing units or data processing structure units provided at S11 to S14 are connected to a common selection line SL1$n$, and those provided at S14, S24, S34, and S44 are connected to a common latch trigger line TLm4. As a result of this, as long as data processing units or data processing structure units are connected to a common command line, the data processing units or data processing structure units substantially simultaneously perform autonomic data processing by a common command signal. If command signals are simultaneously inputted all the command lines, autonomic data processing can be performed simultaneously over the entire regions.

In addition, FIG. 18 adopts a structure in which command selection lines and latch trigger lines are arranged in parallel with each other and arbitrary regions Smn are provided along the direction. For example, data processing units or data processing structure units provided at S11 to S14 are connected to a common selection command line SL1$n$ and a common latch trigger line TL1$n$. As a result of this, the data processing units or data processing structure units perform substantially simultaneously autonomous data processing by a common command signal. If a command signal is simultaneously inputted to all the command lines, autonomous data processing is performed simultaneously over the entire regions, like the case of FIG. 17.

[Tenth Embodiment]

Figure 19B:
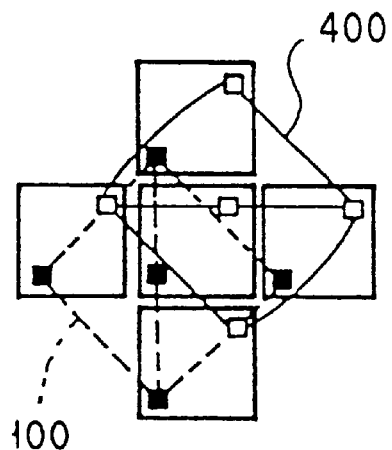
Figure 19C:
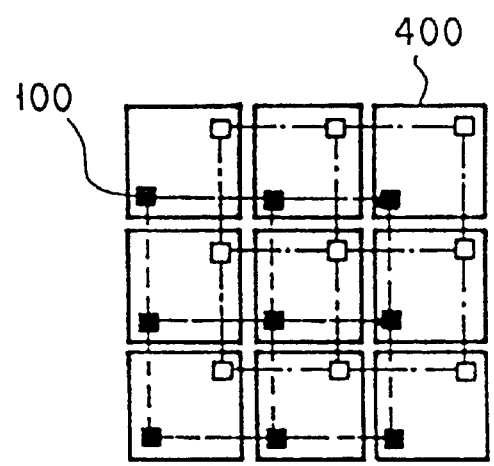
Figure 19D:
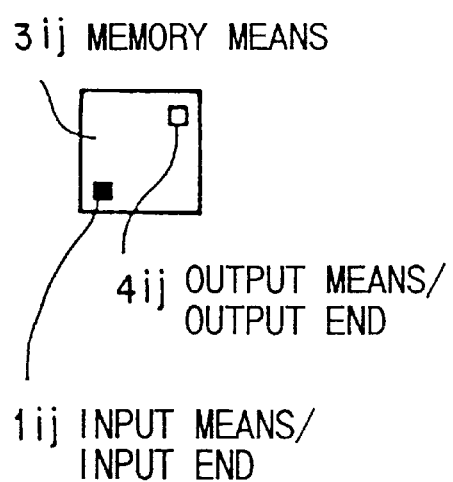

FIG. 19A relates to a tenth embodiment according to the present invention, and is a block diagram showing a basic structure of a data processing structure constituted by four or more data processing units. The data processing structure in the figure consists of, at least, essential elements constituting a data processing unit, i.e., an input 1, an operation circuit 2, a memory element 3, an output 4, a controller 5, an additional process unit or data reproduction circuit 6, a write circuit 7, and a read circuit 8. Here, the plurality of elements is arranged in an array consisting of rows and columns, and each comprises an input 1 and an output 4 (as shown in FIG. 19D illustrated schematically), and memory element 3, input 1, and output 4 are respectively grouped to form a memory region 300, an input region 100, and an output region 400 (as shown in FIG. 19B together with FIG. 19C). In addition, the operation circuit and a logic operation circuit 21, a selector 22, and a selection control circuit 23 constituting the operation circuit 2 are provided in common at the outside of the plurality of memory regions 300, and form an external operation region 200, as a whole. It should be noted that operation results of the external operation region 200 can be inputted again to a data processing unit designated by an address.

To enable accessing with a memory element 3$ij$ of a particular address in the memory region 300, the data structure according to the present embodiment comprises a row address buffer for temporarily storing a row address of an address signal, a row decoder RD connected with the row address buffer RAM to decode a row address, a column address buffer CAB for temporarily storing a column address of an address signal, a column decoder CD connected with the column address buffer CAB to decode a column address, and a sense amplifier SA connected to the column decoder CD, like a conventional DRAM device or SRAM device.

The sense amplifier SA comprises a plurality of sense circuits, and a corresponding sense circuit is activated by an output signal of the column decoder CD, so that access with an arbitrary memory 3$ij$ existing at a cross-position between a row line or word line i (not shown in the figure) corresponding to a row address and a column line or bit line j (not shown in the figure) corresponding to a column address is enabled. In this case, an address transition detection circuit (not shown) for previously activating a necessary sense circuit on the basis of an address signal previously inputted may be provided, connected with the sense amplifier SA. The sense amplifier SA is further connected to an output circuit OC and an input circuit IC. Input data IN from the outside of the system shown in the figure is subjected to appropriate preprocessing represented by impedance conversion by the input circuit IC and is subsequently written into a memory element 3$ij$ through the sense amplifier SA. In this case, the input data IN may be written into the memory through the input 1$ij$ of the memory element 3$ij$. Data stored in the memory element 3$ij$ is extracted through the sense amplifier SA, subjected to appropriate processing by the output circuit OC, and read out as output data OUT to the outside of the system shown in the figure. Operation of the output circuit OC and the input circuit IC is controlled by a control circuit CNT. The control circuit CNT generates a necessary control signal on the basis of an address signal, data previously installed, or other input data not shown.

This embodiment will be understood easily by supposing the memory region 300 as a memory cell. For example, if the memory region is supposed as a SRAM cell, an array constructed by providing a SRAM cell at each of cross-positions between bit lines and word lines corresponds to the memory region 300. In addition, in the case where data is stored into an arbitrary SRAM cell accessed through a word line and a bit line or data is read out therefrom, an input 1$pq$ and an output 4$ij$ at a particular memory element 3$pq$ correspond to an input end or an output end such as an output end connected with an output end constantly connected to the SRAM or a pad which can be selectively connected with a bit line.

In the tenth embodiment, data stored in each of the memory elements of an arbitrary number of data processing units is supplied as first data to the outside operation region 200 from its own output circuit. Data stored in the memory elements may be second data reproduced in the memory elements. However, data stored in the other memory element than the memory element 3$pq$ of a particular data processing unit is first data inputted from the outside, viewed from the particular data processing unit. Other than the data described above, a signal INa of a part of an output of the input circuit IC corresponding to an input signal IN from the outside of the system shown in the figure is inputted as first data into the outside operation region 200 through the input 1$a$. Although a signal INb (not shown) of a part of the input signal IN may be directly inputted as a first signal into the input 1$a$, the input 1$a$ performs appropriate pre-processing represented by impedance conversion in this case, like the input circuit IC. The rest of the signal of the input signal IN from the outside is a third signal and can be written as a second signal into the memory element 3$ij$ through the input circuit IC and the sense amplifier SA.

One or two or more first data items inputted into the external operation region 200 are operated on by the logic operation circuit 21. The logic operation circuit 21 comprises logical operation circuit elements represented by identity, inversion, exclusive OR, exclusive AND, OR, and AND. Which circuit elements should be included, how many circuit elements should be included, or what logical operation should be performed is determined in consideration of, of course, contents of data processing operations requested and external factors such as the size of the data processing structure, simplification of the structure, and the like. One or two or more operation results are selected from one or two or more operation results of the logic operation circuit 21 by the selection circuit 22 and are inputted into the output circuit OC and the input circuit IC. The selection circuit 22 is controlled by selection control circuit 23. The selection control circuit 23 selects an operation result of the logic operation circuit 21, corresponding to an inputted address signal. The selected operation result is read out as output data OUT to the outside of the system or is written as input data IN into the memory element corresponding to an address signal. From this meaning, there are two kinds of input signals IN, one being supplied from the outside and the other being generated internally as an operation result. However, in this embodiment, the operation result generated in an internal section can be read out as output data OUT to the outside of the system, through the input circuit IC and the output circuit OC controlled by the control circuit CNT.

According to the tenth embodiment of the present invention, rolls as basic logic operation elements such as exclusive OR, AND, and the like can be assigned to operation circuits of respective data processing units, and one data process can be realized as a whole. In addition, a data processing structure which performs an aimed data processing function can be constructed by constituting a structure unit from a plurality of data processing units, and by using a plurality of such structure units. That is, an aimed data processing function can be decomposed into a plurality of slightly complicated logic operation elements (which are relatively large elements each constructed by collecting several basic logic operation elements), and circuit design is carried out so as to realize functions of the slightly complicated logic operation elements in data processing structure units corresponding thereto. Subsequently, circuit design can be carried out so as to complete a data processing structure by appropriately arraying or wiring the structure units. Dimer-like and trimer-like data processing structure units described above are important design units to practice such circuit design. This kind of design method is very important in the point that flexibility and degree of freedom of design of dispersed data processing can be enhanced.

How many data processing units as data processing structure units constitute a particular data processing structure is a matter of design. However, where attention is particularly paid to the tenth embodiment in which memory elements 3$ij$ (See, FIG. 19D) are arranged like an array like the case of a conventional memory element, a data processing structure unit may be constituted by total five units consisting of one memory element and four memory elements provided closest thereto, as shown in the FIG. 19B, or may be constituted by total nine units consisting of one means memory elements, four memory elements primarily closest thereto, and four memory elements secondarily closest thereto, as shown in the FIG. 19C, from the viewpoint of geometrical symmetry.

Figure 20A:
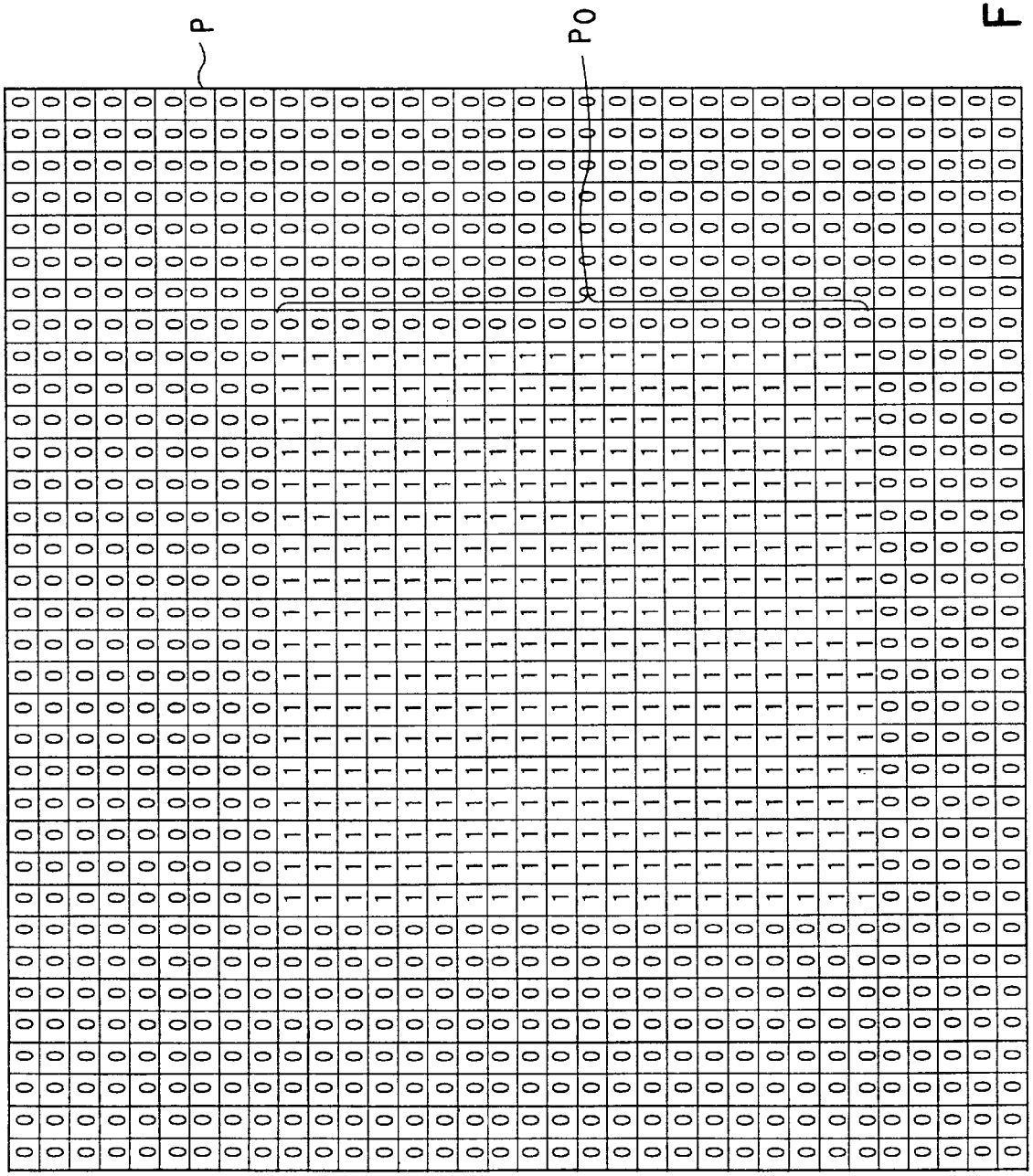
FIGS. 20A and 20B are data views showing an example of operation processing result operated by a semiconductor memory device and stored in itself.
Figure 20B:
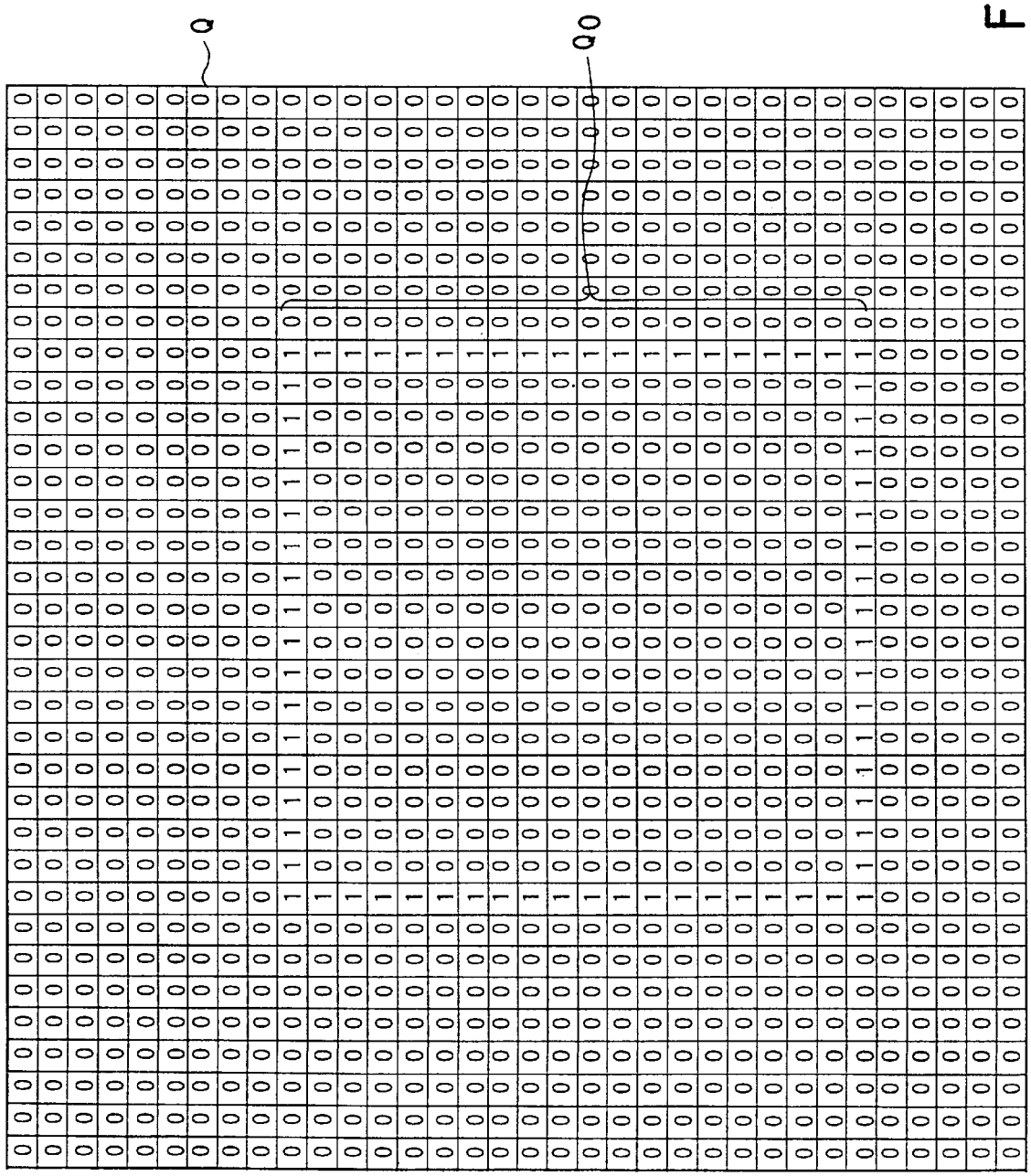

FIGS. 20A and 20B are data showing examples of operation processing results operated by a semiconductor memory device constituted by memory cells adopting the invention of the present application comprising an exclusive OR circuit, and stored in itself. Image data P stored at first in the memory cell array shown in FIG. 20A consists of a predetermined image P0 expressed by a data value "1" and peripheral data values "0". The image data items "1" and too are supplied as first data for autonomous operation processing in the semiconductor memory device according to the present invention. As a result of this operation processing, the data value as second data of an arbitrary memory cell is "0" if it is the same as the data value of a close peripheral memory cell, while the data value is "1" if it is different therefrom. Therefore, a predetermined image P0 is converted into an image Q0 shown in FIG. 20B in which only the contour of the predetermined image P0 is "1", and is stored into the semiconductor memory device. That is, according to the semiconductor memory device according to the present invention in this example, for example, image data taken into the semiconductor chip from the outside is subjected to operation processing in the semiconductor chip to remove noise, and the operation result is stored as contour image data. Thereafter, the contour image data can be read out to an output device (including a display device) provided outside the semiconductor memory device by a conversion read circuit 8 and can be subjected to a further image processing operation or can be visualized if necessary. From this meaning, the semiconductor memory device can be said to be a semiconductor memory device including a noise filter function.

What an additional function can be comprised in the semiconductor memory device or data processing structure according to the present invention depends on how circuit design is performed, and particularly, what logic operation is performed, and is a factor which can be optionally determined by a designer on the basis of technical ideas according to the present invention.

As for the present invention, it is needless to say that various modifications can be considered within the scope of the subject matter thereof and similar effects can be provided. For example, it is apparent that similar advantages of the invention can be provided both in a case of applying the present invention to a SRAM device as a data processing unit and in a case of applying the present invention to a DRAM device, and these modifications do not require discussions about the respects belonging to the technical scope of the present invention. Further, it is apparent that a data processing structure, and/or a semiconductor memory device according to the present invention is realized in a quantum effect device, and that such a quantum effect device belongs to the technical ideas according to the present invention.

As has been explained above, according to the present invention, it is possible to realize a data processing unit or memory structure unit not only having a conventional basic data processing function, i.e., a function of simple writing and reading of data, but also having an autonomous data processing function of processing or operation-processing data inputted from the outside, storing the data into itself, and outputting the data to the outside if necessary. By connecting a plurality of such data processing units or memory structure units, it is possible to realize a data processing structure unit which interacts with each other and performs dispersed data processing in relation to the outside.

Further, by connecting a plurality of data processing units, memory structure units, and/or data processing structure units, it is possible to internally realize a data processing structure or a semiconductor memory device having a special function due to the autonomous data processing function. Further, flexibility and degree of freedom of design of dispersed data processing can be greatly enhanced by the by polymerizing the data processing units and the data processing structure units, by image-assigning arrangement regions respectively for data processing functions or structure elements, by subdividing an aimed operation process into a plurality of processing elements, and by assigning the plurality of processing elements to a plurality of data processing units or data processing structure units, to realize the aimed operation process as a whole, as well as by dividing circuit design into multiple stages in the course of carrying out them.

What is claimed is:

1. A data processing unit comprising:
   an input for inputting first data from outside;
   an operation circuit operating on the first data to generate second data;
   addressable memory storing the second data;
   an output outputting the second data stored in the addressable memory to the outside; and
   a controller controlling the addressable memory to enable storing and outputting of the second data.

2. A data processing unit according to claim 1, characterized by further comprising a data reproduction circuit (6) for reproducing the second data outputted, in the memory.

3. A data processing unit according to claim 1, further comprising:
   write circuit (7) for inputting third data from the outside, and for writing the third data as the second data into the memory; and
   read circuit (8) for reading data stored in the memory, to the outside.

4. A data processing unit according to claim 1, characterized in that the operation circuit is a logic circuit (21) among a group of logic circuits consisting of an identity logic circuit, an inversion logic circuit, an exclusive OR circuit, an exclusive AND circuit, an OR circuit, and an AND circuit.

5. A data processing unit according to claim 1, characterized in that the operation circuit comprises at least two logic circuits (21) among a group of logic circuits consisting of an identity logic circuit, an inversion logic circuit, an exclusive OR circuit, an exclusive AND circuit, an OR circuit, and an AND circuit, and has selector (22) for selecting one from outputs of the at least two logic circuits.

6. A data processing unit according to claim 5, characterized in that the identity logic operation circuit is a circuit (21) for operating third data inputted from the outside.

7. A data processing unit according to claim 1, characterized in that the first data from the outside is second data of another data processing unit according to claim 1.

8. A data processing unit comprising:
   input (1) for inputting first data from outside;
   an operation circuit (2) operating on the first data to output second data;
   addressable memory (3) for storing the second data from the operation circuit;
   data reproduction circuit (6) for reproducing the second data stored in the addressable memory; and
   output (5) for outputting the second data stored reproduced in the data reproduction circuit.

9. A data processing unit according to claim 8, characterized by comprising selector (2312) for alternatively selecting the second data outputted from the operation circuit and the second data outputted from the data reproduction circuit.

10. A data processing unit according to claim 8, further comprising:
    write circuit (7) for inputting third data from the outside, and for writing the third data as the second data into the memory; and
    read circuit (8) for reading data stored in the memory, to the outside.

11. A data processing structure unit including a plurality of data processing units, each including:
    input (101, 102) for inputting first data from outside;
    operation circuit (201, 202) for operating the first data inputted from the input to generate second data;
    memory element (301, 302) for storing the second data;
    output (401, 402) for outputting the second data stored in the memory to the outside;
    the plurality of data processing units having a controller (501, 502) for controlling the memory to enable storing and outputting of the second data; and
    connection circuits electrically connecting first and second data processing units with each other, among the plurality of data processing units.

12. A data processing structure unit according to claim 11, characterized in that the selector (201, 202) comprised in the first and second data processing units are operated by a common command signal.

13. A data processing structure unit according to claim 11, characterized in that at least the memory elements (301, 302) of the first and second data processing units are arranged adjacent to each other, like an array.

14. A data processing structure unit including:
    a plurality of three or more data processing units comprising input (100) for inputting first data from outside, operation circuit (200) for operating the first data inputted from the input to generate second data, memory elements (300) for storing the second data, output (400) for outputting the second data stored in the memory to the outside, and controller (500) for controlling the memory to enable storing and outputting of the second data;
    connection circuits electrically connecting the outputs of first and second data processing units of the plurality of data processing units with each other; and
    connection circuits electrically connecting the output of the second data processing unit and the input of a third data processing unit of the plurality of data processing units with each other.

15. A data processing structure unit according to claim 14, characterized in that the first and second data processing units as well as the second and third data processing units are arranged adjacent to each other, like an array (1).

16. A data processing structure unit according to claim 14, characterized in that the first data of each of the plurality of data processing units is one or two or more data items, and all or a part thereof is the second data outputted from the output (400) of one or two or more different data processing units.

17. A data processing structure unit including a plurality of data processing units comprising:
   input (100) for inputting first data from outside, the first data being one or two or more data items, and all or a part thereof being second data outputted from an output or outputs of one or two or more other of the data processing units;
   operation circuit (200) for operating on the first data inputted from the input to generate the second data;
   memory (300) for storing the second data;
   output (400) for outputting the second data stored in the memory to the outside; and
   controller (500) for controlling the memory to enable storing and outputting of the second data.

18. A data processing structure unit according to claim 17, characterized by comprising connection circuits electrically connecting the input of the plurality of data processing units with the output of another data processing unit.

19. A data processing structure unit including:
   a plurality of data processing structure units each comprising a plurality of data processing units, each comprising input for inputting first data from outside, operation circuit for operating on the first data inputted from the input to generate second data, memory for storing the second data, output for outputting the second data stored in the memory to the outside, and controller for controlling the memory to enable storing and outputting of the second data;
   connection circuits connecting the outputs of first or second data processing units of a first data processing structural unit of the plurality of data processing structure units and the inputs of first or second data processing units of a second data processing structure unit of the plurality of data processing structure units with each other.

20. A data processing structure according to claim 19, characterzied in that the first and second data processing structure units are arranged adjacent to each other.

21. A data processing structure according to claim 19, including a plurality of bit lines (BL1) and a plurality of word lines (WLk), wherein at least one of the first and second data processing units (Smn) is provided at a cross-position between the bit lines and the word lines.

22. A data processing structure comprising:
   a plurality of data processing structure units, each comprising a plurality of three or more data processing units respectively comprising input (100) for inputting first data from outside, operation circuit (200) for operating on the first data inputted from the input to generate second operation circuit (200) for operating on the first data inputted from the input to generate second data, memory (300) for storing the second data, output (400) for outputting the second data stored in the memory to the outside, and controller (500) for controlling the memory to enable storing and outputting of the second data; and
   connection circuits electrically connecting the output of a first, second, or third data processing unit among the plurality of data processing units of a first data processing structure unit among the plurality of data processing structure units and the inputs of a first, second, or third data processing unit among the plurality of second data processing units of a second data processing structure unit among the plurality of data processing structure units with each other.

23. A data processing structure according to claim 22, characterized in that the first and second data processing structure units, as well as the second and third data processing structure units, are arranged adjacent to each other, like an array (1).

24. A data processing structure according to claim 22, including a plurality of bit lines (BL1) and a plurality of word lines (WLk), wherein at least one of the first, second, and third data processing units (Smn) is provided at a cross-position between the bit lines and the word lines.

25. A data processing structure comprising a plurality of data processing units each including:
   operation circuit (200) for operating on first data inputted from other one or two or more other data processing units, by one of a group of logic operations consisting of identity, inversion, exclusive OR, exclusive AND, OR, and AND, to generate second data;
   memory (300) for storing the second data:
   output (400) for outputting the second data stored in the memory to one or two or more other data processing units; and
   controller (500) for controlling the memory to enable storing of the second data.

26. A data processing structure according to claim 25, further including a circuit (600) for reproducing the second data in the memory.

27. A data processing structure according to claim 25, comprising:
   write circuit (700) for inputting third data from outside of each of the data processing units, and for writing the third data as second data into the memory; and
   read circuit (800) for reading data stored in the memory.

28. A data processing structure comprising a plurality of data processing units (Smn) each including:
   operation circuit (200) for operating on first data inputted from one or two or more other data processing units, by at least two of a group of logic operations consisting of identity, inversion, exclusive OR, exclusive AND, OR, and AND, and for selecting one of operation results thereof, as second data;
   memory (300) for storing the second data;
   output (400) for outputting the second data stored in the memory to one or two or more other data processing units; and
   controller (500) for controlling the memory to enable storing of the second data.

29. A data processing structure according to claim 28, comprising:
   write circuit (700) for inputting third data from outside of each of the data processing units, and for writing the third data as second data into the memory; and
   read circuit (800) for reading data stored in the memory.

30. A data processing structure comprising:
   a first group in which a first data processing unit is provided, the first data processing unit comprising input (100) for inputting first data from outside, operation circuit (200) for operating on first data inputted from the input to generate second data, memory (300) for storing the second data, output (400) for outputting the second data stored in the memory to the outside, and controller (500) for controlling the memory to enable storing of the second data;

a second group in which a second data processing unit is provided, the second data processing unit comprising input (100) for inputting first data from outside, operation circuit (200) for operating on first data inputted from the input to generate second data, memory (300) for storing the second data, output (400) for outputting the second data stored in the memory to the outside, controller (500) for controlling the memory to enable storing of the second data, write circuit (700) for inputting third data from the outside, and for writing the third data as the second data into the memory, and read circuit (800) for reading data stored in the memory; and connection circuits electrically connecting the input of at least one of the first data processing unit among the first group and the output of at least one of the second data processing unit among the second ground group with each other.

31. A semiconductor memory device comprising a plurality of bit lines (BL1), a plurality of word lines (WLk), and first and second memory structure units provided at a cross-position between the bit lines and the word lines, wherein each of the first and second memory structure units comprises input (100) for inputting first data from outside, operation circuit (200) for operating on first data inputted from the input to generate second data, memory (300) for storing the second data, output (400) for outputting the second data stored in the memory to the outside, controller (500) for controlling the memory to enable storing and outputting of the second data, switch circuit (2312) in which connection and disconnection between the memory and a bit line are controlled by a word line, and connection circuits electrically connecting the input of the first memory structure unit and the output of the second memory structure unit with each other.

32. A semiconductor memory device according to claim 31, comprising:
 a first region (300) where the memory of the first memory structure unit and the memory of the second memory structure unit are provided;
 a second region (200) different from the first region, where the operation circuit of the first memory structure unit and the operation circuit of the second memory structure unit are provided.

33. A semiconductor memory device according to claim 31, comprising:
 logic operation circuit (200) for operating on the first data by at least two of a group of logic operations consisting of identity, inversion, exclusive OR, exclusive AND, OR, and AND;
 selector (2214, 2314) for selecting one of operation results from the logic operation circuit, as the second data.

34. A semiconductor memory device according to claim 33, characterized in that the selector comprised in the first and second memory structure units are operated by a common command signal.

35. A semiconductor memory device according to claim 31, characterized by comprising data reproduction circuit (2212, 2312, 3 mn) for reproducing the second data stored in the memory.

36. A semiconductor memory device according to claim 35, characterized by comprising selector (22) for alternatively selecting the second data outputted from the operation circuit and the second data outputted from the data reproduction circuit.

37. A semiconductor memory device according to claim 36, characterized in that the selector is controlled by a control command on the word lines.

38. A semiconductor memory device according to claim 35, characterized in that the data reproduction circuit is an identity logic operation circuit which is connected with an output node of the memory to feed back the second data.

39. A semiconductor memory device according to claim 38, characterized in that the output node is selectively connected with the bit lines through the switch circuit and the data reproduction circuit stores data supplied from the bit lines, into the memory.

40. A semiconductor memory device comprising a plurality of bit lines (BL1), a plurality of word lines (WLk), and first, second, and third memory structure units provided at a cross-position between the bit lines and the word lines, wherein each of the first, second, and third memory structure units, respectively comprise input (100) for inputting first data from outside, operation circuit (200) for operating first data inputted from the input to generate second data, memory (300) for storing the second data, output (400) for outputting the second data stored in the memory to the outside, controller (500) for controlling the memory to enable storing of the second data, switch circuit (2312) in which connection and disconnection between the memory and a bit line are controlled by a word line, and connection circuits electrically connecting the input of the first memory structure unit and the output of the second memory structure unit with each other, as well as the input of the second memory structure unit and the output of the third memory structure unit with each other.

41. A semiconductor memory device according to claim 40, characterized in that the first and second memory structure units as well as the second and third memory structure units are arranged adjacent to each other.

42. A semiconductor memory device comprising a plurality of bit lines (BL1), a plurality of word lines (WLk), and a plurality of memory structure units provided at a cross-position between the bit lines and the word lines, wherein each of the memory structure units comprises a plurality of input terminals (100) taking in a plurality of first data items from outside, a plurality of operation circuits (200) for operating on the plurality of first data items inputted from the plurality of input terminals to generate second data, memory (300) for storing the second data, an output terminal (400) for outputting the second data stored in the memory to the outside, controller (500) for controlling the memory to enable storing and outputting of the second data, and switch circuit (2312) in which connection and disconnection between the memory and a bit line are controlled by a word line; and connection circuits electrically connecting the plurality of input terminals of each of the memory structure units itself with the output terminals of the plurality of memory structure units adjacent to each of the memory structure units itself such that the input terminals of each of the memory structure units correspond to the output terminals of the plurality of memory structure units adjacent to each of the memory structure units itself.

43. A semiconductor memory device according to claim 42, wherein the operation circuit comprises logic operation circuit (2 mn) for operating on the first data items by one of a group of logic operations consisting of identity, inversion, exclusive OR, exclusive AND, OR, and AND; and selector (2214, 2314) for selecting one of operation results from the logic operation circuit, as the second data.

44. A semiconductor memory device according to claim 43, characterized in that selectors comprised in the plurality of memory structure units are operated by a common command signal.

45. A semiconductor memory device according to claim 42, wherein the operation circuit comprises logic operation circuit (2 mn) for operating the first data items by at least two of a group of logic operations consisting of identity, inversion, exclusive OR, exclusive AND, OR, and AND, and selector (2214, 2314) for selecting one of operation results from the logic operation circuit, as the second data.

46. A data processing unit characterized by comprising:
   a plurality of inputs (100) for inputting a plurality of first data items from outside;
   first operation circuit (200) for operating on the plurality of first data items to generate a second data item;
   second operation circuit (21) for performing an identity logic operation on a third data item supplied from the outside to generate a different second data item;
   selector (22) for selecting one second data item from the second data item and the different second data item;
   memory (300) for storing the selected second data item;
   output (SA, 8) for outputting the second data item stored in the memory to the outside;
   controller (CNT) for controlling the memory to enable storing and outputting of the second data item;
   a connection node (8) which is supplied with a third data item inputted from the outside and the second data item outputted from the memory and which is connected with the output and the second operation circuit.

47. A data processing unit according to claim 46, characterized by comprising:
   write circuit (7) for supplying the connection node with the third data item;
   read circuit (8) for reading the second data item stored in the memory from the connection node; and
   switch circuit (514) for selectively connecting the write circuit and the read circuit with the connection node.

48. A data processing structure comprising a plurality of data processing units each comprising:
   a plurality of inputs (100) for inputting a plurality of first data items from outside;
   first operation circuit (200) for operating on the plurality of first data items to generate a second data item;
   second operation circuit (21) for performing an identity logic operation on a third data item supplied from the outside to generate a different second data item;
   selector (22) for selecting one second data item from the second data item and the different second data item;
   memory element (300) for storing the selected second data item;
   output (400) for outputting the second data item stored in the memory to the outside; and
   controller (500) for controlling the memory to enable storing and outputting of the second data item, wherein
   a first region (300) where the plurality of memory elements of the plurality of data processing units are arranged in an array, and a second region (200) different from the first region, where the plurality of operation circuits of the plurality of data processing units are provided.

49. A data processing structure according to claim 48, characterized in that the plurality of memory elements are provided at a cross-position between a plurality of bit lines and a plurality of word lines, wherein the memory elements designated by an address is supplied with the third data item through a bit line, and data stored in the memory element designated by an address is read out therefrom through a bit line.

50. A data processing structure according to claim 48, characterized in that the second region is a region (200) for performing a logic operation realized by one logic circuit or a combination of a plurality of logic circuits selected from identity, inversion, exclusive AND, exclusive OR, OR, and AND.

* * * * *